United States Patent

Maurer

[11] Patent Number: 5,146,500
[45] Date of Patent: Sep. 8, 1992

[54] PUBLIC KEY CRYPTOGRAPHIC SYSTEM USING ELLIPTIC CURVES OVER RINGS

[75] Inventor: Ueli Maurer, Weiherhofgasse, Switzerland

[73] Assignee: Omnisec A.G., Switzerland

[21] Appl. No.: 673,716

[22] Filed: Mar. 22, 1991

[30] Foreign Application Priority Data

Mar. 14, 1991 [EP] European Pat. Off. ............ 91103933

[51] Int. Cl.$^5$ ............................................... H04K 1/00
[52] U.S. Cl. ....................................... 380/30; 380/28; 380/23
[58] Field of Search ............................... 380/28, 30, 23

[56] References Cited

U.S. PATENT DOCUMENTS

| | | | |
|---|---|---|---|
| 4,200,770 | 4/1980 | Hellman et al. | 380/30 |
| 4,405,829 | 9/1983 | Rivest et al. | 380/30 |
| 4,748,668 | 5/1988 | Shamir et al. | 380/30 |
| 4,885,777 | 12/1989 | Takaragi et al. | 380/30 |
| 4,995,082 | 2/1991 | Schnorr | 380/30 X |
| 5,029,208 | 7/1991 | Tanaka | 380/30 X |

*Primary Examiner*—Tod Swann
*Attorney, Agent, or Firm*—Egli International

[57] ABSTRACT

The cryptographic system comprises at least one encryption station, one decryption station and a trapdoor generator. The trapdoor generator comprises means for selecting r distinct prime numbers pi, generating a modulus m that is a product of the prime numbers pi, selecting a pair of integers (a,b) satisfying $0 \leq a < m$ and $0 \leq b < m$, computing for each pi a number N(pi) of distinct pairs of integers (x,y) satisfying $0 \leq x < pi$ and $0 \leq y < pi$ and $y^2 \equiv x^3 + a \cdot x + b \pmod{pi}$ and a sum N(pi)+1 representative of an order of an elliptic curve defined as the set of pairs of integers (x,y), computing a least common multiple $\mu$ of the values N(pi)+1, selecting a public multiplier e relatively prime to $\mu$, computing a secret multiplier d according to $d \equiv 1/e \pmod{\mu}$, and transferring data comprising at least m, a, b and e to a storage means provided in the cryptographic system. Alternatively, the trapdoor generator comprises means for selecting r distinct prime numers pi each corresponding to a sum value (pi+1) that satisfies (pi+1)$\equiv$0 (mod j) wherein $1 \leq i \leq r$ and j is 3 or 4, generating a modulus m that is a product of the prime numbers pi, computing the least common multiple $\mu$ of the numbers (pi+1), selecting a public multiplier e relatively prime to $\mu$, computing a secret multiplier d according to $d \equiv 1/e \pmod{\mu}$, and transferring data comprising at least m and e to a corresponding storage means provided in the cryptographic system.

54 Claims, 4 Drawing Sheets

PUBLIC KEY CRYPTOGRAPHIC SYSTEM USING ELLIPTIC CURVES OVER RINGS

BACKGROUND OF THE INVENTION

This invention relates to cryptographic systems comprised of at least one encryption station, at least one decryption station and a trapdoor generator.

Cryptographic systems of this kind are useful as public key cryptographic systems provided with a trapdoor one-way function allowing message encryption and decryption, digital signature schemes and user identification protocols.

Generally, cryptographic systems are widely used to ensure the privacy and authenticity of messages transmitted over public communication channels, such as telephone lines, which are considered to be insecure communication channels. Cryptographic systems are heavily relied on in military, diplomatic and business communications for the transfer of information, including voice, picture and text data, and for identification purposes.

One type of cryptographic system, generally known as a privacy system, prevents extraction of information by unauthorized parties from messages transmitted over an insecure communication channel, thus assuring a sender that a message being sent is read only by an intended receiver. Another type of cryptographic system, generally known as a digital signature scheme, allows the sender of a message to code this message into a signature in such a way that nobody else can generate the signature corresponding to a given message, but everybody can easily verify the signature claimed to correspond to a given message. Yet another type of cryptographic system, generally known as an identification protocol, allows a person (or computer) to prove its identity to a challenger without revealing any information (e.g., a password) that would later allow the verifier to impersonate himself as the previously examined person (or computer).

A conventional type of cryptographic privacy system allows a sender to transmit a plaintext message M to a receiver over an insecure communication channels, e.g. a telephone line. At the sender's site, an encryption device encodes the plaintext message M with the help of a secret key into a ciphertext message C which is then transmitted. At the receiver's site, a decryption device decodes the ciphertext message C back into the plaintext message M with the help of the secret key. Given the knowledge of this secret key, the pertaining encryption and decryption transformations can be performed on the message, absent this knowledge they cannot be performed even with the most powerful computers known or conceivable at present times. Thus, for an eavesdropper who wants to decipher the message and yet is assumed to have no information about the secret key it is not feasible to determine the plaintext message M corresponding to a given ciphertext C, nor is it feasible to determine the secret key when given matching plaintext and ciphertext pairs. However, one problem with this system is that it requires the distribution of secret keys to the communicating parties. This is often done over a secure channel such as priority mail, or in advance using a trusted courier, which can be expensive or even impossible, as in many military applications.

A conventional non-cryptographic signature system is set up as follows. A person wishing to sign documents (e.g. a cheque) deposits an original version of his/her signature at the institution (e.g. a bank) that is supposed to later verify the issued signatures. The original signature could also be made publicly available in a signature directory if everybody should be enabled to verify the signature. The authenticity of documents claimed to be issued by a certain person can be checked, for instance by a judge, by comparing the signature on the document with the original signature. The security of conventional signatures relies in a crucial way on the following assumptions, the importance of all of which is often not completely realized by users of signatures: (1) a person is always able to produce a signature that is sufficiently similar to his/her original signature (capability to reproduce), (2) nobody else is capable of producing signatures that are sufficiently similar to the original signature (impossibility to forge), (3) it is impossible to transfer a valid signature from one document to another (impossibility to transfer), and (4) it is easy for anyone wishing to verify a signature to judge the degree of similarity of a signature with the original (capability to verify).

A conventional non-cryptographic identification protocol can be set up essentially in two different ways. The first way is to let a trusted authority issue a document (e.g. a passport) to every person who applies for a means of being identified. The security of such a system relies on the assumptions that (1) passports cannot be forged and (2) given a passport and a person, it is easy to verify whether they match or not. The second way is to let each person choose a password that is then registered in a password file. This second approach is often used for computer applications where it is impossible to verify certain identification criteria (e.g. eye color), however, it has a crucial security problem: anyone who knows the password, for instance the computer to which a person has identified his/herself, can later impersonate as this person.

Messages exchanged in computer-based cryptographic systems are represented digitally, i.e. they are made up of sequences of numbers and/or letters. Therefore, it should seem inherently impossible to build a cryptographic digital signature system, since every signature would be a digital number that can trivially be copied and hence forged. Similarly, it should seem that no cryptographic identification protocol of the first kind discussed above could exist that prevents a verifier, after he has seen a digital number that convinces him of the identity of a person, from later reusing the same number to impersonate as the previously identified person.

Reference will be made hereinafter to a "user" or "party" rather than to a "person" so as to indicate that in many applications, it is computer systems rather than persons that are communicating and the "user" or "party" then is a device.

A major breakthrough in cryptography was achieved in 1976 when W. Diffie and M. E. Hellman published their seminal paper "New directions in cryptography" in IEEE Trans. on Inform. Theory, vol. IT-22, pp. 664-654, Nov. 1976 (cf. also patent US-A-4200770). Diffie and Hellman proposed a protocol by which two parties A and B who initially do not share any secret whatsoever can talk over a completely insecure channel (e.g. a telephone line that can be tapped by an eavesdropper), and at the end of the protocol each party comes up with one and the same secret key which it is for the eavesdropper completely infeasible to determine, even when given all messages exchanged between A and B. Moreover, Diffie and Hellman suggested that digital signature schemes could be set up if there could be devised a certain type of transformation based on a so-called trapdoor one-way function. However, Diffie and Hellman did not propose an implementation of a trapdoor one-way function, nor did they prove that such a function exists.

Loosely speaking, a trapdoor one-way function is a transformation that maps the elements of a domain set {D} to the elements of a range set {R} such that (1) the transformation is invertible, i.e., every element in the range set corresponds to exactly one element in the domain set, (2) given an element of the domain set, it is easy to compute the corresponding transformed element in the range set, and (3) given an element in the range set, it is completely infeasible to compute the corresponding element in the domain set unless one knows a secret piece of information (the trapdoor).

Diffie and Hellman suggested that a trapdoor one-way function could be used in two different ways. In both applications, a user publishes a description of a trapdoor one-way function while keeping the trapdoor secret. Any other user can thus compute the forward transformation, but none except the legitimate user can feasibly compute the inverse transformation. Here and hereinafter, the solution of a problem is deemed infeasible if no computer system known or conceivably available in a foreseeable future can solve the problem in a reasonable time (e.g. in less than 100 years).

The first of the two applications suggested by Diffie and Hellman is called a public-key cryptographic system. A user can publicly announce an encryption transformation for plaintext messages of such kind that only this user has the capability of deciphering received ciphertext messages. This is achieved by using the trapdoor one-way function as the encryption transformation and its inverse as the corresponding decryption operation. Clearly, all users must agree on a common way of representing plaintext messages as elements of the domain set {D} and ciphertext messages as elements of the range set {R}.

The second application suggested by Diffie and Hellman is called a digital signature scheme. A user can publicly disclose (e.g. register in a public directory similar to the deposition of an original signature) a signature verification transformation such that only this user has the capability of generating the signature corresponding to a given message to be signed. This is achieved by using the trapdoor one-way function as the signature verification transformation and its inverse as the corresponding signature generation transformation. Clearly, all users must agree on a common way of representing messages as elements of the range set {R} and signatures as elements of the domain set {D}. Such a digital signature scheme satisfies the four criteria for signature schemes mentioned above. In particular, transferring signatures is prevented by the fact that each signature only signs one particular message. The fact that one can easily reproduce an issued signature does not harm the system because the signed message cannot be modified. The problem that someone can produce a signature at random without knowing which message it signs can be solved by requiring that the messages be of a special form, e.g. redundant.

It may be noted that the trapdoor one-way function and its inverse are applied in respectively opposite order when a digital signature scheme and a public-key cryptographic system are performed.

The first practical implementation of a trapdoor one-way function and thus, of a public key cryptographic system and a digital signature scheme based on Diffie and Hellman's idea, is described in patent U.S. Pat. No. 4405829 to Rivest, Shamir and Adleman (cf. also R. L. Rivest, A. Shamir and L. Adleman, "A method for obtaining digital signatures and public-key cryptosystems", Communications of the ACM, vol. 21, pp. 120–126, 1978. According to this teaching, a user establishes a so-called RSA trapdoor one-way function by generating two large prime numbers p and q (e.g. each having 100 decimal digits) and selecting a number e that is relatively prime to (p-1) and (q-1). Generating large prime numbers is feasible and known in the art (cf. for instance U. M. Maurer, "Fast generation of secure RSA-moduli with almost maximal diversity", Advances in Cryptology—Eurocrypt'89, Lecture Notes in Computer Science, Vol. 434, Springer Verlag, Berlin, 1990, pp. 636–647, or M. O. Rabin, "Probabilistic algorithms for testing primalty", J. of Number Theory, vol. 12, pp. 128–138, 1980). The user then publishes the product $m = p \cdot q$ of the two primes as well as the exponent e and computes secretly the unique number d satisfying the conditions $$0 \leq d \leq 1 \text{ cm}[(p-1), (q-1)]$$

and $$d \cdot e \equiv 1 \ (\text{mod } 1 \text{ cm}[(p-1), (q-1)])$$

where 1 cm denotes the least common multiple of the numbers listed in the brackets and mod denotes the modulo function, the following features of which are of particular interest hereinafter:

The meaning of congruence equation $a \equiv b \ (\text{mod } c)$ is that a and b have the same remainder when divided by c, which is equivalent to the statement that (a−b) is a (possibly negative or zero) multiple of c. Hereinafter, unless specified differently, b can be any expression involving several numbers or variables, and a is equal to the smallest non-negative integer number that satisfies the above congruence equation $a \equiv b \ (\text{mod } c)$. For instance, the above two congruence equations $$0 \leq d \leq 1 \text{ cm}(p-1)(q-1)$$

and $$d \cdot e \equiv 1 \ (\text{mod } 1 \text{ cm}[(p-1) \cdot (q-1)])$$

can be replaced by the single equivalent equation $$d \equiv 1/e \ (\text{mod } (p-1) \cdot (q-1)).$$

In the above mentioned teaching of Rivest, Shamir and Adleman, d is the secret trapdoor of the RSA trapdoor one-way function. Finding d is generally believed infeasible since it requires knowledge of the prime factors of the modulus m and it is generally believed that factoring large integers into their prime factors is a problem infeasible by computation.

The basic operation required to implement the RSA trapdoor one-way function as well as its inverse is exponentiation modulo the given number m, which will be called the modulus, while e and d will be referred to as the public and the secret exponent, respectively.

There exist well-known techniques for implementing modular arithmetic (cf. for instance D. E. Knuth, "The art of computer programming", vol. 2, 2nd edition, Reading, Mass.: Addison-Wesley, 1981). In particular, a modular exponentiation technique called "square and multiply" is known that is very fast, even when the exponent is a number having several 100 decimal digits. The domain set and the range set of the RSA trapdoor one-way function both are equal to the set $Z_m$ of non-negative integers smaller than m, i.e. $\{D\}=\{R\}=Z_m=\{0,1,\ldots,(m-1)\}$.

To compute the trapdoor one-way function transformation for a given argument $x \in Z_m$ resulting in the transformed value y, the argument x is raised to the e-th power modulo m, i.e. $y \equiv x^e \pmod{m}$. The inverse transformation, viz. raising y to the d-th power modulo m, is similar but can only be performed when the trapdoor d is known, and results in x as has been proved in the above-quoted publication by Rivest, Shamir and Adleman, i.e. $x \equiv y^d \pmod{m}$.

Another application of the RSA trapdoor one-way function was proposed by Fiat and Shamir in U.S. Pat. No. 4748668 (cf. also A. Fiat and A. Shamir, "How to prove yourself: practical solutions to identification and signature problems", Proceeding of CRYPTO '86, Lecture Notes in Computer Science, Vol. 263, Springer Verlag, Berlin, 1987, pp. 186-194). A simplified version of their identification protocol is discussed in the following. A user receives from a trusted authority the secret number s such that $s^2 \equiv ID \pmod{m}$, where ID is a number representing an identity information for identification of the user and m is the product of two large prime numbers. It may be noted that s is the square root modulo m of the number ID. It has been shown that in order to be able to compute square roots modulo m one must know the prime factors of m, which are kept secret by the trusted authority. In order to prove itself, rather than to reveal s and allow the challenger to verify that $s^2 \equiv ID \pmod{m}$ (and thereafter to enable the challenger to impersonate as the user), the user only proves that he knows s, but without revealing it. In fact, one can prove that even if the identification protocol is repeated several times, a challenger cannot obtain any information about s whatsoever that he did not possess before execution of the protocol.

In a simplified version, the Fiat-Shamir protocol works as follows. The user chooses a random number r in $Z_m$ that is relatively prime to m and sends to the challenger the number $r^2 \pmod{m}$ together with the claimed identity information ID. The challenger challenges the user by issuing a randomly chosen binary number b. If b=0, the user must reply by sending r so as to prove that the previously sent $r^2$ was indeed a number of which it knew the square root. If b=1, the user must reply with the number $r \cdot s \pmod{m}$ so as to prove that it knows both r and s. Since the user can each time cheat in this protocol with a 50% chance only, namely when it guesses the challenge variable b correctly in advance, the challenger can be convinced that the user knows s if the protocol is run several times consecutively. The probability of guessing correctly a sequence of n random bits is $2^{-n}$, which is a very small number when n is sufficiently large.

One way of breaking the RSA trapdoor one-way function is by computing the trapdoor exponent d. It has been proved that it is no easier to determine d than it is to find the prime factors p and q of the public modulus m, which, as mentioned above, is assumed to be a very difficult problem. However, it has not been proved that in order to break the cryptographic system based on the RSA trapdoor one-way function it is necessary to compute d and thus to factor m.

SUMMARY OF THE INVENTION

Thus, it is an object of the present invention to provide cryptographic systems comprised of at least one encryption station, at least one decryption station and a trapdoor generator, which cryptographic systems are based on novel trapdoor one-way functions that are more secure than those previously proposed.

A further object of the present invention is to provide public key cryptographic systems including a trapdoor one-way transformation function generator to provide message encryption and decryption, digital signature schemes and user identification protocols, which trapdoor generator generates a novel trapdoor one-way function that is more secure than those previously proposed.

To attain these objects and others which will appear from the description of the invention given hereinafter, the invention provides a cryptographic system comprised of at least one encryption station, at least one decryption station and a trapdoor generator, said trapdoor generator comprising the combination of means alternatively defined in claims 1 or 2. Preferred embodiments of the cryptographic system according to the invention are defined in the appended claims.

The security of the cryptographic system according to the invention relies on the difficulty of factoring a large public modulus m as in the RSA cryptographic system. However, in the cryptographic system according to the invention the transformations involved are operations on so-called elliptic curves over a finite ring, resulting in transformations entirely different from those proposed by Rivest, Shamir and Adleman.

Thus, a feature and advantage of the invention is that the problem of breaking a cryptographic system based on these novel functions is a mathematically different and possibly much more difficult problem than breaking a similar cryptographic system based on the RSA trapdoor one-way function. Accordingly, even if the RSA function would be broken in a way that does not compute the prime factors of m, the cryptographic systems of this invention still are secure.

It is trivial to assign an element of the domain set of the RSA trapdoor one-way function to a given plaintext message in the case of the RSA public key cryptographic system. Any simple standardized transformation assigning numbers selected in $\{0,1,\ldots,(m-1)\}$ to strings of letters will do. If picture data or voice data is transformed in a cryptographic system, similar simple transformations can be applied. These transformations are independent of the cryptographic system used and have no influence on the security of the system.

Clearly, if a string is too long (as can be the case for a public key cryptographic system) it can be divided into smaller sub-strings of suitable size. In a digital signature scheme, the well-known technique of hashing can be used to compress a long message to a sufficiently small number. In this context, a hashing function is a function that assigns to strings of arbitrary length a string of fixed short length (e.g. 50 characters). Obviously, several strings may hash to the same hashed value, but this does not affect the security of a signature scheme if it is very difficult to actually find for a given message another message resulting in the same hashed value. Hashing functions having this property are called cryptographically secure hash functions, and an implementation thereof can be based on any conventional cryptographic system (cf. A. De Santis and M. Yung, "On the design of provably secure cryptographic hash functions", to appear in the proceedings of Eurocrypt'90, Lecture Notes in Computer Science, Berlin, Springer Verlag).

For the trapdoor one-way functions provided by the invention and described below, however, suitable transformations for mapping messages or identities into elements of the domain set D or the range set R without revealing the factorization of the modulus m still need to be defined. The solutions proposed to this effect are included within the scope of the present invention.

DESCRIPTIVE OF THE DRAWINGS

The invention will now be described in closer detail in the following, with reference to the accompanying drawings in which FIG. 1 is a block diagram of a cryptographic system according to the invention in a particular embodiment thereof for use as a digital signature scheme;

DETAILED DESCRIPTION

Figure 1:
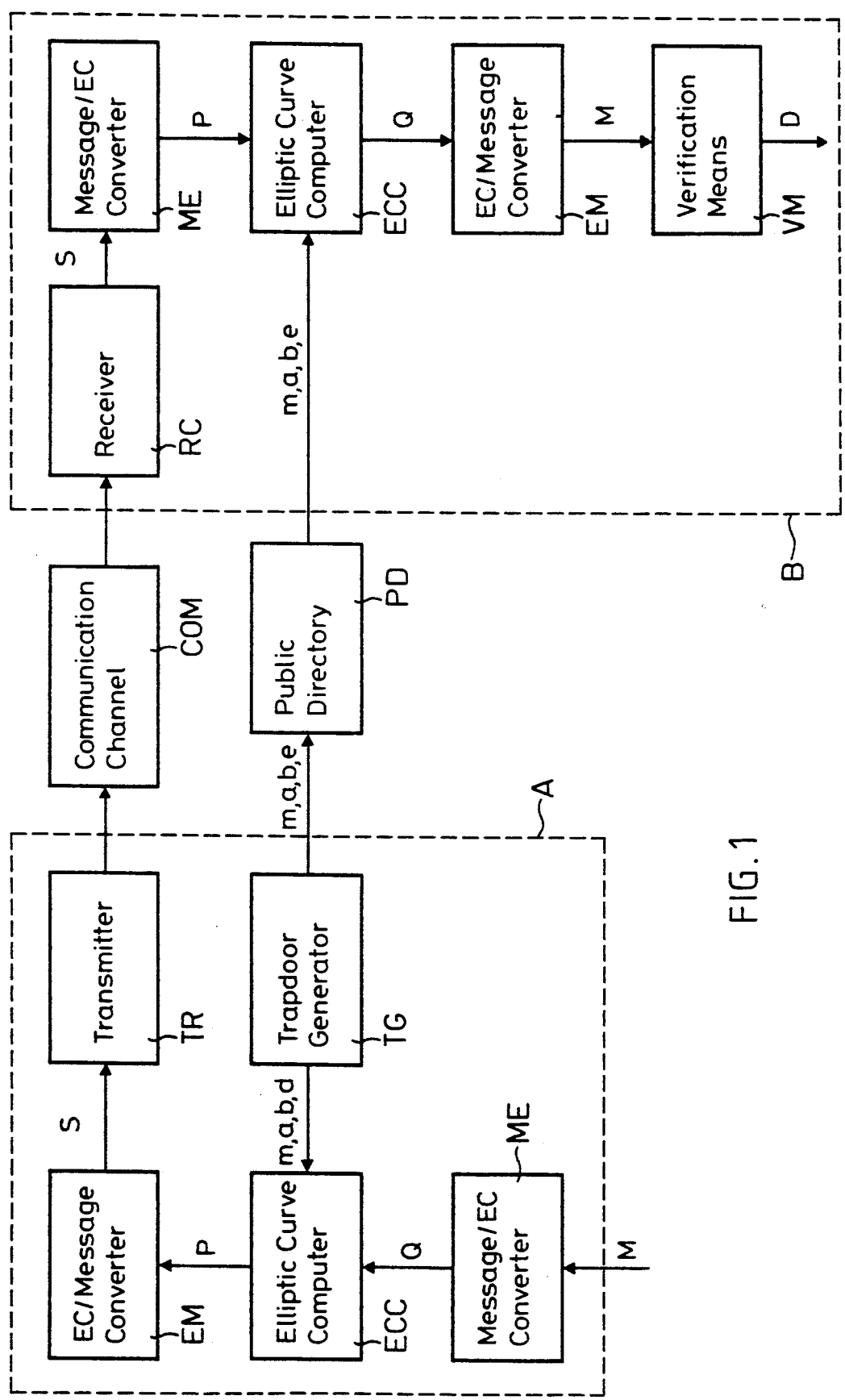

To begin with, there is described the mathematical structures on which the embodiments of the present invention are based. These structures are the finite field $GF(p)$, the finite rin $Z_m$, and elliptic curves over finite fields and rings.

A (mathematical) field consists of a set of elements and two operations, denoted addition and multiplication, which satisfy certain properties. One of these properties is that a field must have a neutral element for multiplication, denoted 1, such that for every element $e$ there must exist an inverse element $e^{-1}$ satisfying $e \cdot e^{-1} = 1$. A well-known example of a field is the field of real numbers for which addition and multiplication is defined in the conventional way. It may be noted that the set of all integers does not form a field because there does not exist for every integer another integer that multiplies with it to 1 (e.g. $\frac{1}{4}$ is not an integer number). Fractions would be required, and indeed, the set of all rational numbers (i.e. fractions) forms a field. In cryptography, one is particularly interested in finite fields, i.e. fields whose sets are finite rather than infinite as for the real numbers. One way to define a finite field is to specify a prime number p and then to let the set of elements of the finite field be the set of numbers $Z_p = \{0, 1, \ldots, (p-1)\}$ and the addition and multiplication operations be addition and multiplication modulo p, respectively. Such a field is denoted $GF(p)$. As in the field of real numbers, one can also define a division operation. Thus, $a/b$ is the unique number c such that $b \cdot c \equiv a \pmod{p}$. To give a simple example, in the field $GF(7)$ the set is $\{0,1,2,3,4,5,6\}$ and for instance $3+8=4$, $5 \cdot 6 = 2$ (since $30 \equiv 2 \pmod 7$), $0 \cdot 4 = 0$ and $\frac{1}{4} = 6$ (since $4 \cdot 6 = 24 \equiv 3 \pmod 7$).

A mathematical structure analogous to the finite field $GF(p)$ can be defined when the modulus is not a prime number. However, this new structure is not a field, as the following example illustrates. When computing modulo 6, there exists no number that when multiplied with 4 and reduced modulo 6 results in 1. The reason is that the result of this multiplication would always be an even number. More generally, the problem is that the greatest common divisor of 4 and 6, denoted $gcd[4,6]$, is not equal to 1. A mathematical structure of this type is called a ring $Z_m$ and m is called its modulus, it has the property that division is not always defined. (A nice property of fields is that one can always divide, except by 0). Nevertheless, the ring $Z_m$ is an important structure in cryptography.

In practical applications, the modulus m of the ring (or the field if m is prime) is a very large number for instance having 200 or more decimal digits. There exist well-known techniques for computing with such huge numbers (cf. for instance D. E. Knuth, quoted above). Addition and multiplication can be implemented by ordinary addition and multiplication, respectively, followed by a modular reduction modulo m, i.e. by a division by m where only the remainder is kept as the result. The only nonobvious operation is that of division, which can easily be implemented by using the extended Euclidean greatest common divisor algorithm (cf. for instance J. D. Lipson, "Elements of algebra and algebraic computing", Benjamin/Cummings, Menlo Park, Calif., 1981). Implementations of these field and ring operations for very large moduli are well known and widely used in cryptographic applications.

Elliptic curves are mathematical structures that have been studied by mathematicians for decades. Only recently has their usefulness for cryptographic purposes been pointed out (cf. for instance N. Koblitz, "A Course in Number Theory and Cryptography", Springer Verlag, N.Y., 1987). They offer an alternative to finite fields for use in the Diffie-Hellman public key distribution protocol (cf. for instance W. Diffie and M. E. Hellman, quoted above). The present invention exploits properties of elliptic curves that have not previously been used in cryptography.

An elliptic curve over a field F consists of the set of distinct pairs of integers $(x,y)$ which satisfy the equation $$y^2 = x^3 + a \cdot x + b,$$

where a and b are parameters of the elliptic curve. Such a solution pair is called a point on the elliptic curve. In addition to the solution points of the above equation, an elliptic curve also contains a so-called point at infinity, denoted $\infty$.

In the following, interest is mainly directed to elliptic curves over finite fields $GF(p)$ where p is a large prime number. For given parameters a and b satisfying $0 a \leq p$ and $0 \leq b < p$ the points on the corresponding elliptic curve, denoted $E_p(a,b)$, are the pairs of integers $(x,y)$ satisfying $$0 \leq x < p$$

$$0 \leq y < p$$

and $y^2 \equiv x^3 + a \cdot x + b \pmod{p}$.

The number of points (including $\infty$) on this elliptic curve $E_p(a,b)$ is denoted $|E_p(a,b)|$ and called the order of the elliptic curve $E_p(a,b)$. The order of an elliptic curve $E_p(a,b)$ can be computed for instance by the Schoof algorithm (cf. R. Schoof, "Elliptic curves over finite fields and the computation of square roots mod", Mathematics of Computation, Vol. 44, No. 170, pp. 483-494, 1985).

For example, considering the elliptic curve $E_{13}(0,1)$, i.e. the set of distinct pairs of integers (x,y) which satisfy the equation $y^2 \equiv x^3 + 1 \pmod{13}$, there are 12 points on this curve, namely $\infty$ (which is on every curve), (4,0), (10,0), (12,0), (0,1), (0,12), (2,3), (5,3), (6,3), (2,10), (5,10) and (6,10). Hence $|E_{13}(0,1)| = 12$.

By defining an appropriate operation (called "elliptic-curve addition", although it has nothing in common with addition in a conventional sense) that assigns to every pair $P_1, P_2$ of points a third point $P_3 = P_1 + P_2$ (called the "sum" of these points), an elliptic curve over a finite field can be interpreted as a finite (mathematical) group in which the point $\infty$ is the neutral element. The a-fold multiple of a point P, denoted $a \cdot P$, is defined as the point obtained by consecutively adding P a number a of times: $a \cdot P = P + P + \ldots + P$ where the number of terms in the sum is a.

The discrete logarithm problem on the elliptic curve having base point P is as follows. Given a point P', find the smallest non-negative number x such that $x \cdot P = P'$, if such a number x exists. The following set of rules specify how addition on elliptic curves can be implemented, i.e. how to compute $P_3 = P_1 + P_2$ for given $P_1 = (x_1, y_1)$ and $P_2 = (x_2, y_2)$:

If either $P_1 = \infty$ or $P_2 = \infty$ or both, then $P_3 = \infty$.

If $x_1 = x_2$ but $y_1 \neq y_2$, which implies that $y_1 \equiv -y_2 \pmod{p}$, then $P_3 = \infty$.

In all other cases $P_3 = (x_3, y_3) = (x_1, y_1) + (x_2, y_2)$ is computed as follows. Let $\tau$ be defined as $\tau \equiv [(y_2 - y_1)/(x_2 - x_1)] \pmod{p}$ if $x_1 \neq x_2$ $\tau \equiv [(3x_1^2 + a)/(2y_1)] \pmod{p}$ if $x_1 = x_2$ If none of the above two cases applies, the denominator is always non-zero and thus the division is defined. The resulting point $P_3 = (x_3, y_3)$ is defined by $x_3 \equiv \tau^2 - x_1 - x_2 \pmod{p}$ $y_3 \equiv \tau \cdot (x_1 - x_3) - y_1 \pmod{p}$ All operations (additions, subtractions, multiplications and divisions) have to be performed in the field GF(p). Clearly, when $P_1 = P_2$, then the first one of last equations is equivalent to $x_3 \equiv \tau^2 - 2x_1$, the use of which may slightly speed up computation.

For example, considering the same elliptic curve $E_{13}(0,1)$ as in the preceding example, the point $P_3 = (2,3) + (6,10)$ can be computed as follows: $\tau \equiv (10-3)/(6-2) \equiv 7/4 \equiv 5 \pmod{13}$; the last step follows from $4 \cdot 5 \equiv 7 \pmod{13}$. Hence $x_3 \equiv 5^2 - 2 - 6 \equiv 4 \pmod{13}$ and $y_3 \equiv -5 \cdot (4-2) - 3 \equiv 0 \pmod{13}$ and thus $P_3 = (4,0)$.

Elliptic curves are usually considered only over fields, but it is possible to extend the definition to elliptic curves over the rin $Z_m$, where m is the product of a multiplicity r of distinct prime numbers p1, . . . , pi, . . . , pr, wherein i is an integer satisfying the conditions $1 \leq i \leq r$. The elliptic curve $E_m(a,b)$ is defined as the set of solutions pairs (x,y) satisfying the conditions $0 \leq x < m$ and $0 \leq y < m$ and the congruence equation $y^2 \equiv x^3 + a \cdot x + b \pmod{m}$.

For reasons explained below the point at infinity is not included in this case. According to the well-known Chinese remainder theorem, every point (x,y) on $E_m(a,b)$ can be uniquely represented as a list of r points on the elliptic curves $E_{p1}(a,b), \ldots, E_{pi}(a,b), \ldots, E_{pr}(a,b)$, i.e. as a list of pairs $[(x_1, y_1), \ldots, (x_i, y_i), \ldots, (x_r, y_r)]$ where for $1 \leq i \leq r$ $x_i \equiv x \pmod{pi}$ $y_i \equiv y \pmod{pi}$ To compute the list $[(x_1,y_1), \ldots, (x_i,y_i), \ldots, (x_r,y_r)]$ for a given point (x,y) on $E_m(a,b)$ and vice versa is state of the art (cf. for instance J. D. Lipson, quoted above).

An addition operation can be defined on $E_m(a,b)$ as follows. Two points on $E_m(a,b)$ can be added by first computing the corresponding two lists of points on $E_{p1}(a,b), \ldots, E_{pi}(a,b), \ldots, E_p(a,b)$, the addition being performed by components according to the addition rule on elliptic curves over a finite field, and then computing the point on $E_m(a,b)$ corresponding to this list. This operation is well-defined except when the resulting point on one of the elliptic curves $E_{p1}(a,b), \ldots, E_{pi}(a,b), \ldots, E_{pr}(a,b)$ is the point $\infty$ since in this case it is impossible to transform the list of points back to $E_m(a,b)$. It may be noted, however, that when the prime factors pi of m are all very large, then the probability that the sum of two randomly selected points on $E_m(a,b)$ is not defined is extremely small.

The key observation that will allow to build a trapdoor one-way function-based on computations on the elliptic curve $E_m(a,b)$, where the factorization of m is the trapdoor, is that the above defined addition operation can be executed using only operations in the ring $Z_m$, i.e. without knowledge of the prime factors p1, . . . , pi, , . . . , pr of m. This is achieved by simply using the same rule as for addition on an elliptic curve over a finite field, i.e. the two points $P_1$ and $P_2$ on $E_m(a,b)$ are added to result in $P_3 = (x_3, y_3) = P_1 + P_2$ by computing $\tau$ according to the rule $\tau \equiv [(y_2 - y_1)/(x_2 - x_1)] \pmod{m}$ if $x_1 \neq x_2$ $\tau \equiv [(3x_1^2 + a)/(2y_1)] \pmod{m}$ if $x_1 = x_2$ and using the formulas $x_3 \equiv \tau^2 - x_1 - x_2 \pmod{m}$ $y_3 \equiv \tau \cdot (x_1 - x_3) - y_1 \pmod{m}$ As indicated, all operations (additions, subtractions, multiplications and divisions) have to be performed in the ring $Z_m$. A problem with the above addition rule is that the quantity $\tau$ is not defined when the denominator is not relatively prime to m. This problem occurs if and only if one of the resulting points on the curves $E_{p1}(a,b)$, ..., $E_{pi}(a,b)$, ..., $E_{pr}(a,b)$, when considering the addition as performed by components, is the point at infinity ∞. As mentioned above, the risk that such a problem occurs when two randomly selected points on $E_m(a,b)$ are added is extremely small and can well be accepted as a very small risk of system failure. In fact, should such a problem occur, this failure could immediately be used to generate a non-trivial factor of m. Therefore, if factoring m is difficult such a failure cannot occur except with very small probability, since otherwise the very execution of a computation on $E_m(a,b)$ would be a feasible factoring algorithm, which is believed not to exist. Although $E_m(a,b)$ is not a group as would be required for most cryptographic protocols to guarantee their successful execution, one can prove (cf. for instance S. Goldwasser and J. Kilian, "Almost all primes can be quickly certified", Proceedings of the 18th ACM Symposium on Foundations of Computer Science, pp. 316-329, 1986, wherein elliptic curves over rings are considered in a different context) that unless the computation fails by failure of a division (see above), $E_m(a,b)$ behaves for an observer just as if it were a group. In particular, all the cryptographic systems that will be discussed below work successfully as if $E_m(a,b)$ actually were a group.

It is well-known that when prime factors of m are given, a computation in the ring $Z_m$ can be sped up by performing the computation modulo each prime factor $p_i$ separately, and then combining these results.

To set up a trapdoor one-way function based on an elliptic curve over $Z_m$, a user (or some trusted authority) can generate a modulus m that is the product of r suitably chosen distinct prime numbers $p1, \ldots, pi, \ldots, pr$, i.e. $m = p1 \cdot p2 \ldots pi \ldots pr$. The user then secretly computes the orders of the elliptic curves $|E_{p1}(a,b)|, \ldots, |E_{pi}(a,b)|, \ldots, |E_{pr}(a,b)|$, the least common multiple of $\mu$ of these orders, i.e.

$$\mu = \text{lcm}[|E_{p1}(a,b)|, \ldots, |E_{pi}(a,b)|, \ldots, |E_{pr}(a,b)|],$$

selects a public multiplier e relatively prime to $\mu$, and computes the secret multiplier d according to the equation $$d = 1/e \pmod{\mu}.$$

The user then publishes m, a, and e. The domain set $\{D\}$ and the range set $\{R\}$ of the trapdoor one-way function both are equal to the points $(x,y)$ on the elliptic curve $E_m(a,b)$. For a given point P, the trapdoor one-way function transformation resulting in the point Q is defined by $$Q = e \cdot P \text{ on } E_m(a,b).$$

and the corresponding operation is defined by $$P = d \cdot Q \text{ on } E_m(a,b).$$

It can be shown that although the addition operation on $E_m(a,b)$ is in some very special cases not defined, the point $Q = e \cdot P$ is always defined. For a large number e a point P can efficiently be multiplied by e by using the so-called repeated doubling method (cf. for instance D. E. Knuth, quoted above). Let $e_k e_{k-1} e_{k-2} \ldots e_1 e_0$ be the unique binary representation of e such that $e_k = 1$ and $e = 2^k + e_{k-1} \cdot 2^{k-1} + \ldots + e_1 \cdot 2 + e_0$. Then $Q = e \cdot P$ can be computed by computing the sequence $f_1 \cdot P, f_2 \cdot P, \ldots, f_k \cdot P$ of points where $f_i$ is the number represented by the first i bits of $e_k e_{k-1} e_{k-2} \ldots e_1 e_0$, i.e. $f_i$ is the quotient when e is divided by $2^i$. For instance, 37 is represented in binary as 100101 and hence the point $Q = 37P$ can be computed by computing $2P = P + P$, $4P = 2P + 2P$, $8P = 4P + 4P$, $9P = 8P + P$, $18P = 9P$, $36P = 18P + 18P$ and $Q = 37P = 36P + P$. It may be noted that the number of addition operations that must be performed is only equal to the length of the representation of e plus the number of 1's in this representation minus 2, which is much smaller that e itself. For $e = 37$ the number of required additions is 7.

Clearly, the system can also be set up for a fixed public multiplier e, for example $e = 5$, which in this case still is considered to have been selected, although but once for all. The only modification required is that the selected prime numbers pi must satisfy the condition that $(p_i + 1)$ and e are relatively prime.

In FIG. 1 there is shown a block diagram of a digital signature scheme based on the above described trapdoor one-way function in which a user A can generate a signature corresponding to a given message and transmit the signature to one or several verifiers who can verify the authenticity and integrity of the signed message. For the sake of simplicity, only one verifying user (user B) is shown in FIG. 1.

A user A wishing to later sign messages uses a trapdoor generator TG to generate the parameters m, a, b, e and d and registers the public parameters m, a, b and e together with his name in a public directory PD. These parameters correspond to the original signature that is deposited for later reference in a conventional signature system.

The directory need not be public, and in fact in many application the signer may only wish to enable a selected set of users to verify his signatures by exclusively providing them with the parameters m, a, b and e.

The parameter d is a secret parameter that is stored secretly by the signer.

Given the system parameter r, the trapdoor generator generates r prime numbers $p1, \ldots, pi, \ldots, pr$ and forms their product $m = p1 \ldots pi \ldots pr$. a and b are appropriately chosen integer numbers satisfying the conditions $0 \leq a < m$ and $0 \leq b < m$. The trapdoor generator then computes the orders of the elliptic curves $E_{p1}(a,b), \ldots, E_{pi}(a,b), \ldots, E_{pr}(a,b)$, computes $\mu$ according to $$\mu = \text{lcm}[|E_{p1}(a,b)|, \ldots, |E_{pi}(a,b)|, \ldots, |E_{pr}(a,b)|],$$

chooses an appropriate number e that is relatively prime to $\mu$, and computes $d = 1/e \pmod{\mu}$.

In order to sign a message M represented by an integer x, user A converts x it into a point $Q(s,t)$ on the elliptic curve $E_m(a,b)$ using a message-to-elliptic-curve converter ME. In a preferred embodiment, this is achieved by choosing the first coordinate s of Q as a well-defined public function of x such that $s^3 + a \cdot s + b$ is a quadratic residue (a square) modulo m. For instance, if x is a message in the range $0 \leq x < m/1000$, then s could be defined as the smallest integer greater or equal to $1000 \cdot x$ such that $s^3 + a \cdot s + b$ is a quadratic residue (a square) modulo m. The point on $E_m(a,b)$ that uniquely represents the message x is then defined as $(s,t)$, where t is one of the $2^r$ square roots modulo m (for instance the smallest one) of $s^3 + a \cdot s + b$. The square root of a number s modulo m, which exists if and only if $s = 0$ or s is a quadratic residue modulo m, can easily be computed when the factors of m are known, by computing the square roots of s modulo each prime factor pi of m and combining the results using the Chinese remainder technique. For prime factors pi of m for which (pi+1) is divisible by 4, a square root of a number can be computed by raising this number to the power (pi+1)/4 modulo m. When (pi−1) is divisible by 4, Peralta's efficient algorithm can be used (cf. R. Peralta, "A simple and fast probabilistic algorithm for computing square roots modulo a prime number", IEEE Transactions on Information Theory, Vol. IT-32, pp. 846–847, 1986).

The signature message S corresponding to the message $M=<x>$ is obtained by computing the point $P(u,v)$ on $E_m(a,b)$ in an elliptic-curve computation means ECC according to $$P(u,v) = d \cdot Q(s,t)$$

and converting P into a signature message S using an elliptic-curve-to-message converter EM. The signature message S is represented by the two integer number u and v, i.e. $S=<u,v>$. A transmitter TR is then used to send the signature message S over communication channel COM to user B.

Clearly, the conversion from P to S in the elliptic-curve-to-message converter EM of user A's device in FIG. 1 is trivial and consists in forwarding to the transmitter TR the binary representations of two integer numbers u and v either unchanged or concatenated, as may be required for input to the transmitter TR. The elliptic-curve-to-message converter EM is shown included in user A's device in FIG. 1 merely to represent and interface the different nature of the mathematical objects P and S, the former being a point of the elliptic curve and the latter a message.

Upon receiving the signature message S over communication channel COM using a receiver RC, user B converts the signature message S into a point $P=(u,v)$ on the elliptic curve $E_m(a,b)$ using a message-to-elliptic-curve converter ME, then computes the point $Q(s,t)$ on $E_m(a,b)$ in an elliptic-curve computation means ECC according to $$Q(s,t) = \cdot P(u,v)$$

and converts the obtained point Q into message $M=<x>$ using an elliptic-curve-to-message converter EM. This last step is easily achieved in the above described preferred embodiment by extracting the number x representing the message M from the coordinate s of P simply by dividing s by 1000.

Clearly again, the conversion from S to P in the message-to-elliptic-curve converter ME of user B's device is trivial and consists in forwarding to the elliptic-curve computation means ECC the binary representations of two integer numbers u and v either unchanged or separated, as may be required by the output of the receiver RC. The message-to-elliptic-curve converter ME is shown included in user B's device in FIG. 1 merely to represent and interface the different nature of the mathematical objects S and P, the former being a message and the latter a point of the elliptic curve.

If sufficient redundancy is included in the integer x representative the message M, an eavesdropper can be prevented from generating signatures at random in an attack where he does not care about which message the forged signature actually corresponds to. For instance, s can be the smallest integer greater or equal to x for which there exists an integer t such that $Q(s,t)$ is representative of a point on $E_m(a,b)$. To ensure that such an integer s actually can be found and cannot be representative of another message than $M=<x>$, in a preferred embodiment there are accepted as messages only such integers whose binary representation has a predetermined number of least significant bits all having a same binary value which can be "one" or "zero". For instance, the 30 least significant bits of s all are zeros. This provision at the same time also ensures that the transmitted message has an inherent redundancy sufficient to make it completely improbable that a randomly selected point (s,t) on $E_m(a,b)$ might be representative of a duly signed message M. The occurrence of said redundancy finally is checked by user B in a verification means VM.

Unfortunately, the above described trapdoor one-way function cannot be used to build up a public-key cryptographic system, because without knowing the factorization of m it is infeasible by computation to find a point on $E_m(a,b)$ that can be associated with a given number x representing a message M.

The new trapdoor one-way functions according to the invention are based on the observation that there exist certain classes of elliptic curves which all have the same order.

It can be shown that if (pi+1) is divisible by 3 and $a=0$, then for all b satisfying the conditions $0 \leq b < pi$ the order of the elliptic curve $E_{pi}(0,b)$ just is $|E_{pi}(0,b)| = (pi+1)$.

Similarly, it can be s that if (pi+1) is divisible by 4 and $b=0$, then for all a satisfying the conditions $0 \leq a < pi$ the order of the elliptic curve $E_{pi}(a,0)$ just is $|E_{pi}(0,b)| = (pi+1)$.

The fact that the order of a elliptic curves in a class of elliptic curves is the same allows to compute the parameter $\mu$ even though the actual elliptic curve is determined only later, when a message is being selected. A crucial observation is that when either one of the parameters a or b of the elliptic curve $E_m(a,b)$ is fixed, then the step of selecting a point (x,y) on the elliptic curve uniquely determines the other parameter b or a, respectively.

Allowing messages to be pairs (x,y) of integers representative of a point $P(x,y)$ of the elliptic curve rather than being only one of two coordinates (e.g. the coordinate x as in the trapdoor one-way function described above) offers two major advantages. The first advantage is that it is not necessary to compute the second coordinate corresponding to the given message coordinate, which computation in general requires knowledge of the prime factors of m (this is the very reason why the trapdoor one-way function described above can only be used as a digital signature scheme, not as a public key cryptographic system). The second advantage is that the message size is doubled and thus the encryption can be sped up by a factor of 2.

Figure 2:
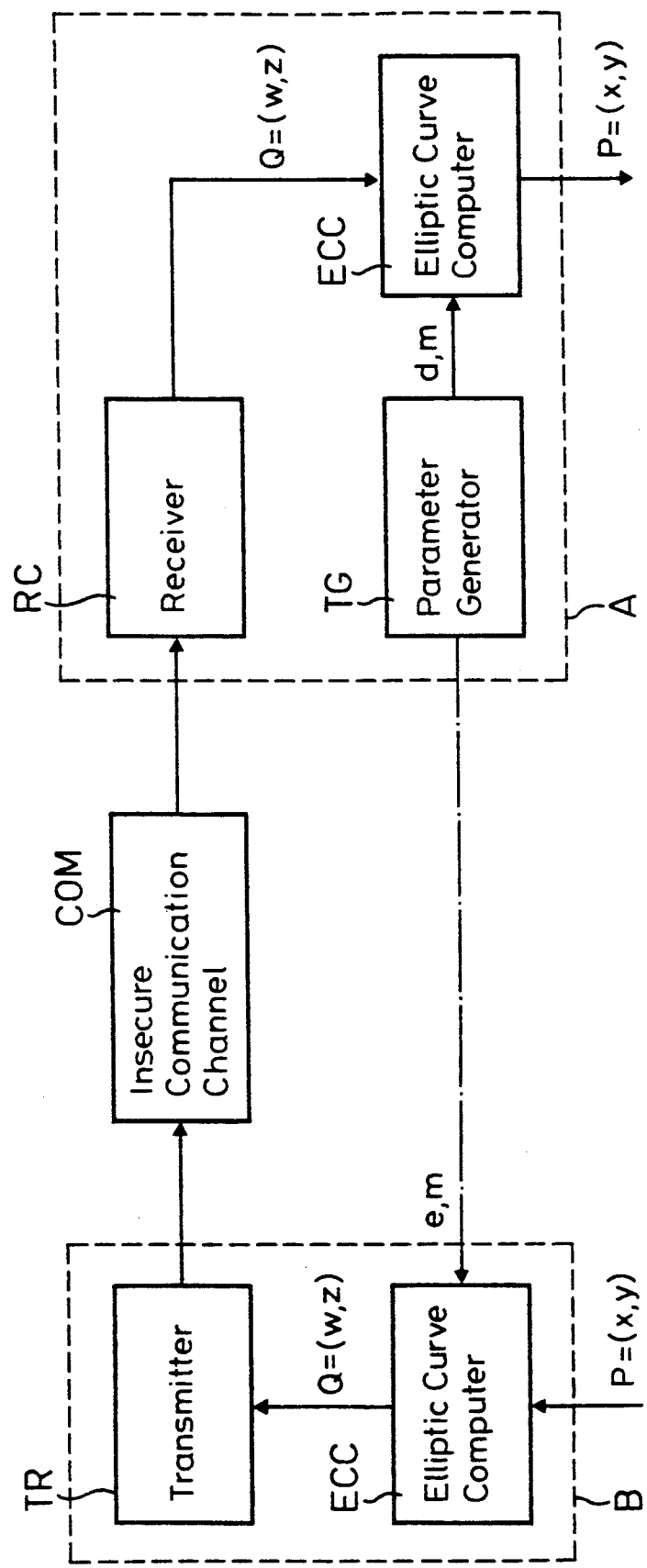
FIG. 2 is a block diagram of a cryptographic system according to the invention in a particular embodiment thereof adapted for message encryption and decryption.

FIG. 2 shows a public-key cryptographic system based on either of the above described choices of parameters and in which a user A publishes the description of an encryption transformation for which he but nobody else can feasibly perform the corresponding decryption operation. Any other user can then send cryptographically secure enciphered messages to user A without sharing any secret key with him. For the sake of simplicity, only one other user (user B) is shown in FIG. 2.

The following description is given for the first choice of parameters, and a slight modification required for the second choice of parameters will be described later.

In order to set up the public-key cryptographic system, user A uses the trapdoor generator to generate parameters m, e and d. Given the system parameter r, the trapdoor generator generates r prime numbers $p_1, \ldots, p_i, \ldots, p_r$ such that, for each of them, the respective value $p_i+1$ is divisible by 3, and then forms their product $m = p_1 \ldots p_i \ldots p_r$. The trapdoor generator then computes $\mu$ according to $$\mu = 1\ \text{cm}[p_1+1, \ldots, p_i+1, \ldots, p_r+1],$$

chooses an appropriate number e that is relatively prime to $\mu$ and computes d according to $$d = 1/e \ (\text{mod } \mu).$$

User A then publishes the two parameters m and e and stores the parameter d secretly. The dashed line in FIG. 2 indicates that user B receives user A's published parameters, for instance by using a public directory service.

To encipher a message $M = \langle x,y \rangle$ for user A, where the message consists of a pair of integers (x,y) satisfying the conditions $0 \leq x < m$ and $0 \leq y < m$, user B considers the elliptic curve $E_m(0,b)$ on which the point P(x,y) is located and computes a point Q(w,z) on the same elliptic curve in an elliptic-curve computation means ECC according to $$Q(w,z) = e \cdot P(x,y)$$

The parameter b is implicitly given by $b \equiv y^2 - x^3$ (mod m), but it need not be computed since the elliptic curve addition (and thus also the multiplication) algorithm do not depend on b. In other words, the elliptic curve on which the points P and Q are located is implicitly defined but no explicit description is required. The encrypted message which is then transmitted by a transmitter TR over an insecure communication channel COM consists of a pair of integers (w,z) representative of the point Q, i.e. the encrypted message is $Q = \langle w,z \rangle$.

Upon receiving the ciphertext message $Q = \langle w,z \rangle$ over the communication channel COM by means of a receiver RC, user A computes the point P(x,y) on the same elliptic curve in an elliptic-curve computation means ECC according to $$P(x,y) = d \cdot Q(w,z),$$

whereby the plaintext message $M = \langle x,y \rangle$ is recovered.

The following example illustrates this public-key cryptographic system for a set of parameters that are much too small to offer any security at all. In a preferred embodiment, m could be the product of two primes each having 100 to 150 decimal digits.

Let $r = 2$ and let the two primes be $p_1 = 17$ and $p_2 = 23$. Thus, $m = 17 \cdot 23 = 391$. It may be noted that both $(p_1+1)$ and $(p_2+1)$ are divisible by 3. Therefore, $|E_{17}(0,b)| = 17+1 = 18$ and $|E_{23}(0,b)| = 23+1 = 24$ for all $b \neq 0$, hence $\mu = 1\ \text{cm}[18,24] = 72$. Let further $e = 5$, which implies that $d = 29$ since $5 \cdot 29 = 145 \equiv 1$ (mod 72). Consider a message represented by the pair of integers $\langle 127,203 \rangle$. This implies that $b = 220$ and thus that all computations will actually be on the elliptic curve $E_{391}(0,220)$, but it actually is not necessary to know b in order to use the system. To encipher the message point $P = (127,203)$ it must be multiplied by 5. This is achieved by consecutively computing $2P = P+P$, $4P = 2P+2P$ and $5P = 4P+P$. The computation of $2P = (x_2, y_2) = (127,203) + (127,203)$ will be demonstrated in detail. According to the rules of addition on an elliptic curve $E_m(a,b)$ one computes $\tau = 3 \cdot 127^2/(2 \cdot 203)$. One has $3 \cdot 127^2 = 48387 \equiv 294$ (mod 391) and $2 \cdot 203 \equiv 15$ (mod 391). Now, 1/15 (mod 391) is found to be 365, as can easily be verified by checking that $15 \cdot 365 \equiv 1$ (mod 391). Thus one obtains $\tau \equiv 294/15 \equiv 294 \cdot 365 \equiv 176$ (mod 391), $x_2 \equiv 176^2 - 2 \cdot 127 = 30722 \equiv 224$ (mod 391), and $y_2 \equiv 176 \cdot (127-224) - 203 = -17275 \equiv 320$. Hence $2 \cdot (127,203) = (224,320)$ on the elliptic curve. Similarly, one finds that $4P = (224,320) + (224,320) = (350,230)$ and $Q = 5 \cdot P = (127,203) + (350,230) = (364, 261)$. The ciphertext message is thus the pair of numbers $\langle 364,261 \rangle$. In a similar way as for the computation of $Q = 5 \cdot P$ one can also perform the deciphering operation $P = 29 \cdot Q$ by computing consecutively $2Q = Q+Q$, $3Q = 2Q+Q$, $6Q = 3Q+3Q$, $7Q = 6Q+Q$, $14Q = 7Q+7Q$, $28Q = 14Q+14Q$ and finally $29Q = 28Q+Q = P = (127,203)$.

As mentioned above, another possible choice of the parameters is to let $p_i+1$ be divisible by 4 and $b = 0$. A public-key cryptographic system can be set up in a manner completely analogous to the above description. The only change required is due to the fact that the elliptic-curve addition operation depends on a, while it is independent of b. Thus, the elliptic-curve computation means ECC of FIG. 2 must compute a according to $$a \equiv [(y^2/x) - x^2]\ (\text{mod } m)$$

and $$a \equiv [(z^2/w) - w^2]\ (\text{mod } m)$$

respectively, prior to performing the elliptic-curve multiplication.

It will be apparent that the two above-described trapdoor functions can also be used to set up a digital signature scheme in which messages and signatures consist of pairs of integers representing points on a particular one of a class of elliptic curves.

The same trapdoor one-way functions as described above can also be used to set up user identification protocols.

Figure 3:
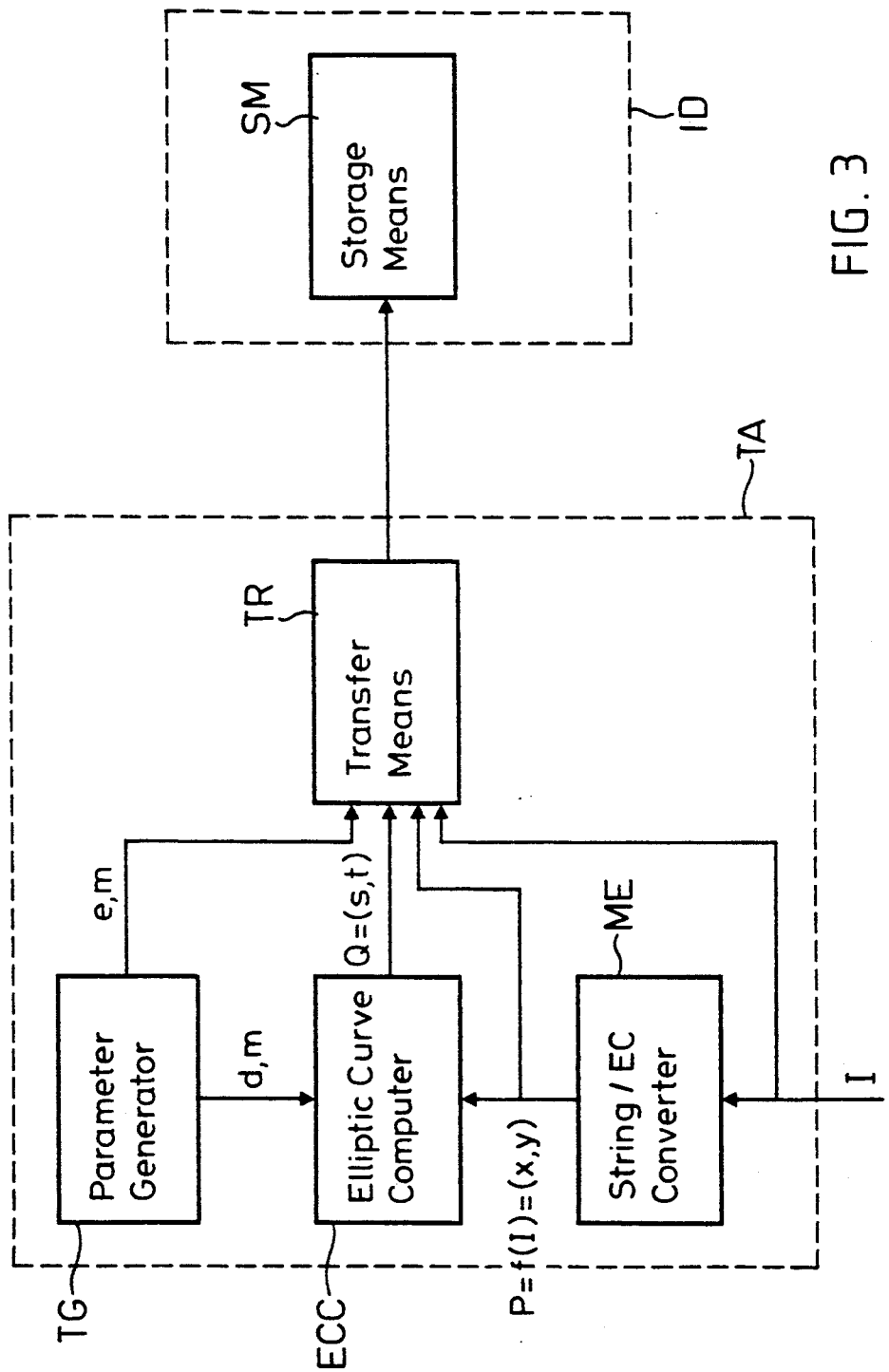
FIG. 3 is a block diagram of a cryptographic system according to the invention in a particular embodiment thereof adapted for generating parameters useful for user identification.
Figure 4:
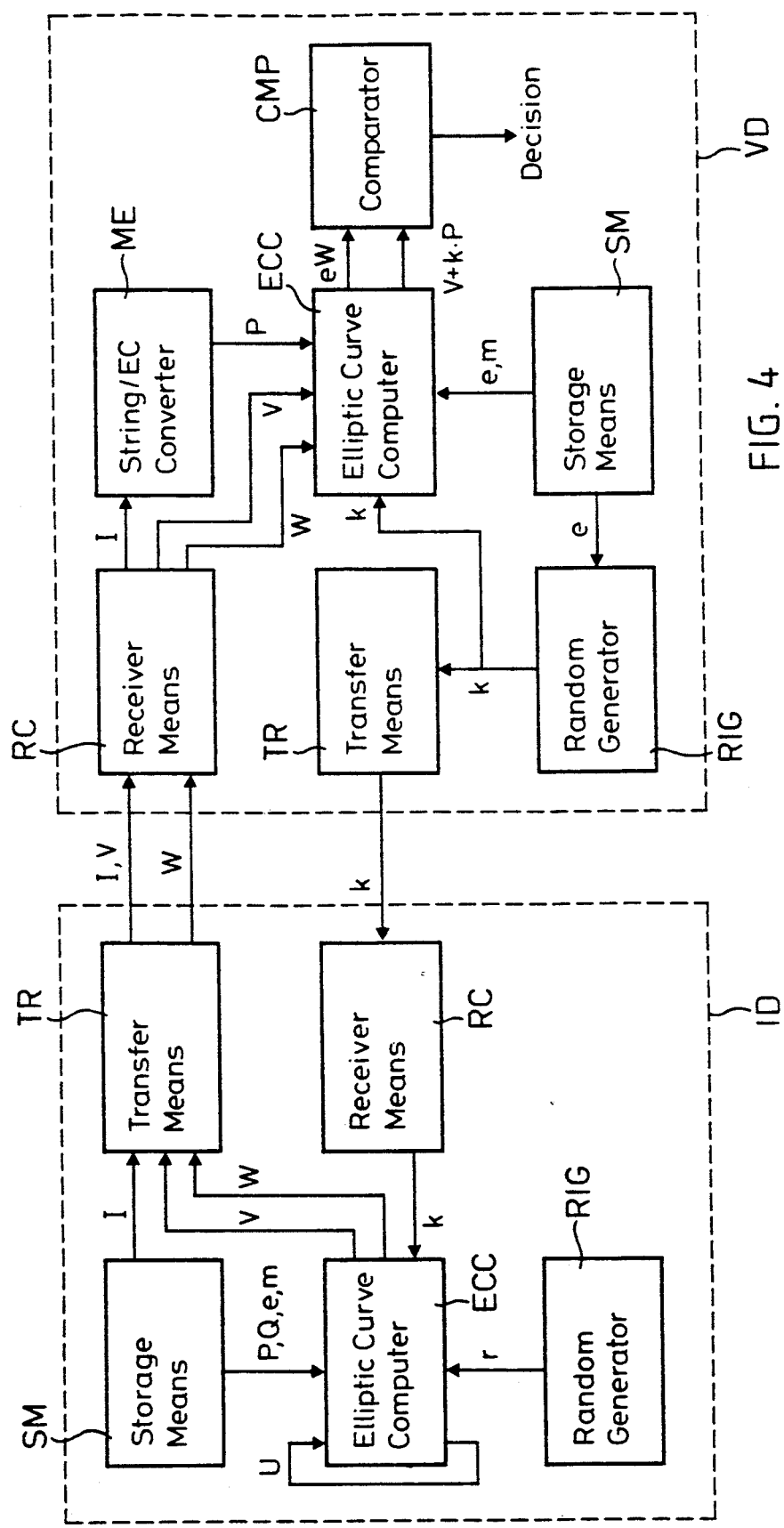
FIG. 4 is a block diagram of a cryptographic system according to the invention in a particular embodiment thereof adapted for verification of a user identity.

One particular preferred embodiment of such a system is described in FIGS. 3 and 4 and involves a combination of a trusted authority device TA, a verifying device VD and user identification devices ID which are for instance embodied as security modules or smart cards.

Before issuing the first identification device, a trapdoor generator TG provided in the trusted authority device TA secretly chooses r prime numbers $p_1, \ldots, p_i, \ldots, p_r$ such that, for each of them, the respective value $p_i+1$ is divisible by 3, and then forms their product $m = p_1 \ldots p_i \ldots p_r$. The trapdoor generator TG then computes $\mu$ according to $$\mu = 1\ \text{cm}[p_1+1, \ldots, p_i+1, \ldots, p_r+1],$$

chooses an appropriate number e that is relatively prime to $\mu$ and computes d according to $d \equiv 1/e \pmod{\mu}$ A transmitter TR provided in the verifying device VD of the trusted authority then makes public the parameters m and e as well as an easy to compute function f that assigns pairs of integers (x,y) satisfying the conditions $0 \leq x < m$ and $0 \leq y < m$ to identification strings. For instance, this function f could be defined as "splitting the identification string in two halves and representing each half as one integer".

Also, it is preferred to store m and e into a storage means SM provided in the verifying device VD, else the verifying device VD would later have to interrogate a public directory for parameters m and e instead of having obtained them directly from the trusted authority device TA.

When a user applies for an identification device ID, the trusted authority checks his identity and forms a string I uniquely representative of this identity. I could contain the user's name, physical description, clearance information, expiration date of the device, and so on. A message-to-elliptic-curve converter ME provided in the trusted authority device TA then computes a pair of integers (x,y) representative of a point P on an elliptic curve according to $$P(x,y) = f(I).$$

The trusted authority device TA then computes a point Q(s,t) on the same elliptic curve in an elliptic-curve computation means ECC according to $$Q(s,t) = d \cdot P(x,y)$$

and stores m, e, P and Q into a storage means SM of the applying user's identification device ID.

In order to prove a user's identity to a verifier, the user's identification device ID performs the following protocol with the verifying device VD of the verifier.

First, a random integer generator RIG provided in the identification device ID chooses a random integer r satisfying the condition $0 \leq r \leq 1$ wherein 1 is an integer provided as a setting in the identification device and satisfying the condition $1 < m$. Then, an elliptic-curve computation means ECC provided in the identification device ID computes a point $U(u_x, u_y)$ of the same elliptic curve as that on which P is located, according to $$U(u_x, u_y) = r \cdot P(x,y).$$

In a preferred embodiment, the computation of U is performed during an idle time of the identification device, when no identification procedure is performed. Integer r need not be chosen at random each time, instead, several random points $U(u_x, u_y)$ could be stored for instance in the storage means SM and combinations thereof can be formed each time a point $U(u_x, u_y)$ is required. It is important in this case that the set of random points $U(u_x, u_y)$ be updated sufficiently often.

The identification device ID then computes in the elliptic-curve computation means ECC a point $V(v_x, v_y)$ of the same elliptic curve as that on which P is located, according to $$V(v_x, v_y) = e \cdot U(u_x, u_y)$$

The identification device ID then sends the claimed identity I and the message $(v_x, v_y)$ representative of the point $V(v_x, v_y)$ to the verifying device VD of the verifier, use being made of a transmitter TR provided in the identification device ID and of a receiver RC provided in the verifying device VD.

The verifying device VD first makes an initial check, possibly in cooperation with an examining person making a physical description of a user person to be identified, if any. The physical description of the user person (e.g. his/her fingerprint, eye background, etc.) is compared with that claimed in the string I. Optionally, also the expiration date or other parameters may be checked.

The verifying device VD then randomly selects a random integer k satisfying the condition $0 \leq k \leq (e-1)$ and sends k as a challenge to the identification device ID, using a transmitter TR provided in the verifying device VD.

The identification device ID is provided with a receiver RC for receiving k from the verifying device VD, and it has to respond to the challenge by sending an answer $(w_x, w_y)$ representative of the point $W(w_x, w_y)$ defined by $$W(w_x, w_y) = U(u_x, u_y) + k \cdot Q(s,t)$$

which it computes with its elliptic-curve computation means ECC. By means of the transmitter TR provided in the identification device ID, the latter's answer $(w_x, w_y)$ representative of the point $W(w_x, w_y)$ is transmitted to the verifying device VD where there are computed, by means of an elliptic-curve computation means ECC and the storage means SM provided in the verifying device VD, points $T1(t1_x, t1_y)$ and $T2(t2_x, t2_y)$ of the same elliptic curve as that on which P is located, according to $$T1(t1_x, t1_y) = e \cdot W(w_x, w_y)$$

and $$T2(t2_x, t2_y) = V(v_x, v_y) + k \cdot P(x,y)$$

wherein P(x,y) is computed according to P(x,y) = f(I) as described above in respect of the trusted authority's computation.

Finally, in a comparator CMP provided in the verifying device VD, it is checked whether points $T1(t1_x, t1_y)$ and $T2(t2_x, t2_y)$ are identical: in the affirmative, the identification device ID and its user are accepted as genuine, in particular, it is ascertained that the identification-requesting user actually is that one which corresponds to the identification string I.

It can be proved that the only possible way by which a fraudulent impersonator who does not know the point Q(s,t) could cheat is to guess the challenge number k correctly in advance. The chances of success are only 1:e, which is very small when e is sufficiently large. In a preferred embodiment, e is a prime number of the order of for instance $10^6$ to $10^9$. This protocol can also be repeated several times to further reduce an eavesdropper's chance of successful impersonation.

The following may be noted, which will readily appear from the preceding description of the invention. Generally, in a cryptographic system according to the invention, if the system is used for public-key message encryption and decryption the trapdoor generator will be located in the decryption station, while if the system is used as a digital signature scheme the trapdoor generator will be located in the encryption station, and if the system is used for user identification the trapdoor generator will be located in the trusted authority device. Clearly, instead of providing that the trapdoor generator is located in the respective station or device as explained above, it is equivalent to provide that the trapdoor generator is located somewhere else and transmits the necessary parameters to the respective station or device mentioned above, for storage of these parameters therein.

A detailed view of the means provided in a cryptographic system according to the invention is given below. It must be understood that the means listed below may be embodied as separate devices or integrated in part or completely in one or several devices. In this sense, means are repeatedly listed below, some or all of which may merged into single means performing several operations in succession.

A first embodiment of the trapdoor generator is comprised of means for selecting a multiplicity r of distinct prime numbers pi wherein i is an integer satisfying the conditions $1 \leq i \leq r$;

means for generating a modulus m that is a product of the prime numbers pi;

means for selecting a pair of integers (a,b) satisfying the conditions $0 \leq a < m$ and $0 \leq b < m$;

means for computing, for each prime number pi, a number N(pi) of distinct pairs of integers (x,y) satisfying the conditions $0 \leq x < pi$ and $0 \leq y < pi$ and further satisfying the condition $$y^2 = x^3 + a \cdot x + b \pmod{pi}$$

and for computing from the numbers N(pi) a sum value N(pi)+1 representative of an order of such an elliptic curve which is defined as the set of the pairs of integers (x,y);

means for computing a least common multiple $\mu$ of the sum values N(pi)+1;

means for selecting a public multiplier e which is relatively prime to $\mu$;

means for computing a secret multiplier d according to an equation $$d = 1/e \pmod{\mu};$$

and transfer means for transferring data comprising at least the modulus m, pair of integers (a,b) and public multiplier e to a corresponding storage means provided in the cryptographic system for locally storing the data therein.

A second embodiment of the trapdoor generator is comprised of means for selecting a multiplicity r of distinct prime numbers pi each having a respectively corresponding sum value (pi+1) that satisfies the condition $$(pi+1) = 0 \pmod{j}$$

wherein i is an integer satisfying the conditions $1 \leq i \leq r$ and j is an integer whose value is selected from 3 or 4;

means for generating a modulus m that is a product of the prime numbers pi;

means for computing the least common multiple $\mu$ of the numbers (pi+1);

means for selecting a public multiplier e which is relatively prime to $\mu$;

means for computing a secret multiplier d according to an equation $$d = 1/e \pmod{\mu};$$

and transfer means for transferring data comprising at least the modulus m and public multiplier e to a corresponding storage means provided in the cryptographic system for locally storing the data therein.

In this second embodiment of the trapdoor generator, preferably the selected value of integer j is provided as a setting in all stations of the cryptographic system, or the data transferred by the transfer means also comprise the selected value of integer j.

In both the first and second embodiment of the trapdoor generator, preferably, the corresponding storage means is a public directory which can be interrogated by any station of the cryptographic system for locally storing therein the data transferred from the trapdoor generator by the transfer means, or the corresponding storage means is included in a station of the cryptographic system for locally storing therein the data transferred from the trapdoor generator by the transfer means.

If the system is used as a digital signature scheme, the encryption station is a signature encryption station which comprises the first embodiment of the trapdoor generator;
either
  means for selecting an integer x subjected to predetermined conditions provided as a setting in all stations of the cryptographic system;
or
  input means for being inputted an integer x subjected to predetermined conditions provided as a setting in all stations of the cryptographic system;
  storage means for the inputted integer x;
and further:
a message-to-elliptic-curve converter means for computing from the integer x a pair of integers (s,t) such that
  the integer s satisfies a predetermined relationship to the integer x, which relationship is provided as a setting in all stations of the cryptographic system, and
  the pair of integers (s,t) satisfies the condition $$t^2 = s^3 + a \cdot s + b \pmod{m}$$

whereby the integers (s,t) are representative of a point Q(s,t) of the elliptic curve;
an elliptic-curve computation means for performing on the point Q(s,t) an elliptic-curve computation $$P(u,v) = d \cdot Q(s,t)$$

for computing a point P(u,v) of the elliptic curve whose coordinates are a pair of integers (u,v) representative of an encrypted signature corresponding to the integer x; and
transmission means for transmitting the pair of integers (u,v) for reception thereof at a signature decryption station.

Again if the system is used as a digital signature scheme, and if the encryption station is a signature encryption station which, however, does not comprise the trapdoor generator, then the trapdoor generator is constructed according to the first embodiment and further comprises means for transferring at least the multiplicity r of distinct prime numbers pi, modulus m, pair of integers (a,b) and secret multiplier d to the signature encryption station, and the signature encryption station comprises
either
  input means for being inputted at least the multiplicity r of distinct prime numbers pi, modulus m, pair of integers (a,b) and secret multiplier d;
  storage means for at least the inputted multiplicity r of distinct prime numbers pi, modulus m, pair of integers (a,b) and secret multiplier d; and
  means for selecting an integer x subjected to predetermined conditions provided as a setting in all stations of the cryptographic system;
or
  input means for being inputted at least the multiplicity r of distinct prime numbers pi, modulus m, pair of integers (a,b) and secret multiplier d, and further for being inputted an integer x subjected to predetermined conditions provided as a setting in all stations of the cryptographic system;
  storage means for at least the inputted multiplicity r of distinct prime numbers pi, modulus m, pair of integers (a,b), secret multiplier d and integer x;
and further:
a message-to-elliptic-curve converter means for computing from the integer x a pair of integers (s,t) such that
  the integer s satisfies a predetermined relationship to the integer x, which relationship is provided as a setting in all stations of the cryptographic system, and
  the pair of integers (s,t) satisfies the condition $$t^2 \equiv s^3 + a \cdot s + b \pmod{m}$$

whereby the integers (s,t) are representative of a point Q(s,t) of the elliptic curve;
an elliptic-curve computation means for performing on the point Q(s,t) an elliptic-curve computation $$P(u,v) = d \cdot Q(s,t)$$

for computing a point P(u,v) of the elliptic curve whose coordinates are a pair of integers (u,v) representative of an encrypted signature corresponding to the integer x; and
transmission means for transmitting the pair of integers (u,v) for reception thereof at a signature decryption station.

Preferably, if the system is used as a digital signature scheme as described last, the message-to-elliptic-curve converter means comprises
means for computing the integer s from the integer x by assigning to the integer s the smallest value which satisfies the condition $$s \geq x$$

and for which the expression $$s^3 + a \cdot s + b \pmod{m}$$

evaluates to a quadratic residue (mod m); and means for computing the integer t as a square root (mod m) of the quadratic residue (mod m).

Also preferably, if the system is used as a digital signature scheme as described last, the integer x is selected to have a predetermined inherent redundancy, and more preferably the integer x is selected such that its binary representation has a predetermined number of least significant bits all having a same binary value.

Again, if the system is used as a digital signature scheme as described last, the decryption station is a signature decryption station which comprises
receiver means for receiving the pair of integers (u,v) representative of an encrypted signature corresponding to the integer x;
either
  means for interrogating a public directory for being transferred therefrom at least the modulus m, the pair of integers (a,b) and the public multiplier e;
  storage means for at least the transferred modulus m, pair of integers (a,b) and public multiplier e;
or
  input means for being inputted at least the modulus m, pair of integers (a,b) and public multiplier e transferred from the trapdoor generator by the transfer means;
  storage means for at least the transferred modulus m, pair of integers (a,b) and public multiplier e;
and further:
an elliptic-curve computation means for performing, on the point P(u,v) of the elliptic curve whose coordinates are the pair of integers (u,v), an elliptic-curve computation $$Q(s,t) = e \cdot P(u,v)$$

for computing a point Q(s,t) of the elliptic curve whose coordinates are the pair of integers (s,t); and
an authentication means comprising
  means for computing a decrypted signature from at least the integer s in consideration of the predetermined relationship between the integer s and the integer x, and
  means for determining whether the decrypted signature satisfies the predetermined conditions to which integer x is subjected, in which case the decrypted signature is proved authentic.

Preferably, if the system is used as a digital signature scheme and the decryption station is a signature decryption station as described last, the authentication means comprises means for determining whether each of the t least significant bits of integer s has the one and the same predetermined binary value.

In another series of embodiments, if the system is used as a digital signature scheme, the encryption station is a signature encryption station which comprises
the second embodiment of the trapdoor generator;
either
  means for selecting a pair of integers (x,y) satisfying the conditions $0 \leq x < m$ and $0 \leq y < m$ and further subjected to predetermined conditions provided as a setting in all stations of the cryptographic system;
or
  input means for being inputted a pair of integers (x,y) satisfying the conditions $0 \leq x < m$ and $0 \leq y < m$ and further subjected to predetermined conditions provided as a setting in all stations of the cryptographic system;
and further:

means for computing integer a according to equation $$a = [(y^2/x) - x^2] \pmod{m}$$

in case the value j=4 has been selected and according to equation a=0 in case the value j=3 has been selected for the integer j at the trapdoor generator, in which latter case the means for computing integer a actually can be dispensed with;

storage means for the inputted pair of integers (x,y);

an elliptic-curve computation means for performing, on a point P(x,y) of an elliptic curve which point is representative of the integers (x,y), an elliptic-curve computation $$Q(w,z) = d \cdot P(x,y)$$

using the value of integer a computed in the computing means to compute a point Q(w,z) of the elliptic curve whose coordinates are a pair of integers (w,z) representative of an encrypted signature corresponding to the pair of integers (x,y); and transmission means for transmitting the pair of integers (w,z) for reception thereof at a signature decryption station.

Again if the system is used as a digital signature scheme using a trapdoor generator constructed according to the second embodiment thereof, and if the encryption station is a signature encryption station which, however, does not comprise the trapdoor generator, then the encryption station is a signature encryption station, the trapdoor generator further comprises means for transferring at least said multiplicity r of distinct prime numbers pi, modulus m and secret multiplier d to the signature encryption station, and the signature encryption station comprises input means for being inputted at least said multiplicity r of distinct prime numbers pi, modulus m and secret multiplier d;

storage means for at least said inputted multiplicity r of distinct prime numbers pi, modulus m and secret multiplier d;

either means for selecting a pair of integers (x,y) satisfying the conditions $0 \leq x < m$ and $0 \leq y < m$ and further subjected to predetermined conditions provided as a setting in all stations of the cryptographic system;

or input means for being inputted a pair of integers (x,y) satisfying the conditions $0 \leq x < m$ and $0 \leq y < m$ and further subjected to predetermined conditions provided as a setting in all stations of the cryptographic system;

storage means for the inputted pair of integers (x,y);

and further:

means for computing integer a according to equation $$a = [(y^2/x) - x^2] \pmod{m}$$

in case the value y=4 has been selected and according to equation a=0 in case the value j=3 has been selected for the integer j at the trapdoor generator, in which latter case the means for computing integer a actually can be dispensed with;

an elliptic-curve computation means for performing, on a point P(x,y) of an elliptic curve which point is representative of the integers (x,y), an elliptic-curve computation $$Q(w,z) = d \cdot P(x,y)$$

using the value of integer a computed in the computing means to compute a point Q(w,z) of the elliptic curve whose coordinates are a pair of integers (w,z) representative of an encrypted signature corresponding to the pair of integers (x,y); and transmission means for transmitting the pair of integers (w,z) for reception thereof at a signature decryption station.

Preferably, if the system is used as a digital signature scheme and the encryption station is a signature encryption station as described last, and if the selected value of integer j is provided as a setting in all stations of the cryptographic system, then the decryption station is a signature decryption station which comprises either means for interrogating a public directory for being transferred therefrom at least the modulus m and public multiplier e;

storage means for at least the transferred modulus m and public multiplier e;

or input means for being inputted at least the modulus m and public multiplier e transferred from the trapdoor generator by the transfer means;

storage means for at least the transferred modulus m and public multiplier e;

receiver means for receiving the pair of integers (w,z) representative of an encrypted message corresponding to the pair of integers (x,y);

means for computing integer a according to equation $$a = [(z^2/w) - w^2] \pmod{m}$$

in case the value j=4 has been selected and according to equation a=0 in case the value j=3 has been selected for the integer j at the trapdoor generator, in which latter case the means for computing integer a actually can be dispensed with;

an elliptic-curve computation means for performing, on a point Q(w,z) of the elliptic curve whose coordinates are the pair of integers (w,z), an elliptic-curve computation $$P(x,y) = e \cdot Q(w,z)$$

using the value of integer a computed in the computing means to compute a point P(x,y) of the elliptic curve whose coordinates are the pair of integers (x,y) representative of a decrypted message; and an authentication means for determining whether the elliptic-curve computation means has successfully computed a pair of integers (x,y) satisfying the predetermined conditions provided as a setting in all stations of the cryptographic system.

Also preferably, if the system is used as a digital signature scheme and the encryption station is a signature encryption station as described last, and if the data transferred by the transfer means also comprise the selected value of integer j, then the decryption station is a signature decryption station which comprises either means for interrogating a public directory for being transferred therefrom at least the modulus m, public multiplier e and integer j;

storage means for at least the transferred modulus m, public multiplier e and integer j;

or input means for being inputted at least the modulus m, public multiplier e and integer j transferred from the trapdoor generator by the transfer means;

storage means for at least the transferred modulus m, public multiplier e and integer j;

and further:

receiver means for receiving the pair of integers (w,z) representative of an encrypted message corresponding to the pair of integers (x,y);

means for computing integer a according to equation $$a \equiv [(z^2/w) - w^2] \pmod{m}$$

in case the value j=4 has been selected and according to equation a=0 in case the value j=3 has been selected for the integer j at the trapdoor generator, in which latter case the means for computing integer a actually can be dispensed with;

an elliptic-curve computation means for performing, on a point Q(w,z) of the elliptic curve whose coordinates are the pair of integers (w,z), an elliptic-curve computation $$P(x,y) = e \cdot Q(w,z)$$

using the value of integer a computed in the computing means to compute a point P(x,y) of the elliptic curve whose coordinates are the pair of integers (x,y) representative of a decrypted message; and an authentication means for determining whether the elliptic-curve computation means has successfully computed a pair of integers (x,y) satisfying the predetermined conditions provided as a setting in all stations of the cryptographic system.

If the system is used for public-key message encryption and decryption, the encryption station is a message encryption station which comprises either, if the storage means is a public directory which can be interrogated by any station of the cryptographic system for locally storing therein the data transferred from the trapdoor generator by the transfer means, and if the selected value of integer j is provided as a setting in all stations of the cryptographic system, means for interrogating a public directory for being transferred therefrom at least the modulus m and public multiplier e;

storage means for at least the transferred modulus m and public multiplier e;

or, again if the storage means is a public directory which can be interrogated by any station of the cryptographic system for locally storing therein the data transferred from the trapdoor generator by the transfer means, but if the data transferred by the transfer means also comprise the selected value of integer j, means for interrogating a public directory for being transferred therefrom at least the modulus m, public multiplier e and integer j;

storage means for at least the transferred modulus m and public multiplier e and integer j;

or, if the corresponding storage means is included in a station of the cryptographic system for locally storing therein the data transferred from the trapdoor generator by the transfer means, and if the selected value of integer j is provided as a setting in all stations of the cryptographic system, input means for being inputted at least the modulus m and public multiplier e transferred from the trapdoor generator by the transfer means;

storage means for at least the transferred modulus m and public multiplier e;

or, if the corresponding storage means is included in a station of the cryptographic system for locally storing therein the data transferred from the trapdoor generator by the transfer means, but if the data transferred by the transfer means also comprise the selected value of integer j, input means for being inputted at least the modulus m, public multiplier e and integer j transferred from the trapdoor generator by the transfer means;

storage means for at least the transferred modulus m, public multiplier e and integer j;

and further:

message input means for being inputted a pair of integers (x,y) representative of a message, satisfying the conditions $0 \leq x < m$ and $0 \leq y < m$;

means for computing integer a according to equation $$a \equiv [(y^2/x) - x^2] \pmod{m}$$

in case the value j=4 has been selected and according to equation a=0 in case the value j=3 has been selected for the integer j at the trapdoor generator, in which latter case the means for computing integer a actually can be dispensed with;

an elliptic-curve computation means for performing, on a point P(x,y) of an elliptic curve which is representative of the integers (x,y), an elliptic-curve computation $$Q(w,z) = e \cdot P(x,y)$$

using the value of integer a computed in the computing means to compute a point Q(w,z) of the elliptic curve whose coordinates are a pair of integers (w,z) representative of an encrypted message corresponding to the pair of integers (x,y); and transmission means for transmitting the pair of integers (w,z) for reception thereof at a message decryption station.

Preferably, if the system is used for public-key message encryption and decryption and the encryption station is a message encryption station as described last, the decryption station is a message decryption station which comprises the second embodiment of the trapdoor generator;

receiver means for receiving the pair of integers (w,z) representative of an encrypted message corresponding to the pair of integers (x,y);

means for computing integer a according to equation $$a \equiv [(z^2/w) - w^2] \pmod{m}$$

in case the value=4 has been selected and according to equation a=0 in case the value j=3 has been selected for the integer j at the trapdoor generator, in which latter case the means for computing integer a actually can be dispensed with; and an elliptic-curve computation means for performing, on a point Q(w,z) of the elliptic curve whose coordinates are the pair of integers (w,z), an elliptic-curve computation $$P(x,y) = d \cdot Q(w,z)$$

using the value of integer a computed in the computing means to compute a point P(x,y) of the elliptic curve whose coordinates are the pair of integers (x,y) representative of a decrypted message.

Preferably, if the decryption station is a message decryption station as described last,
the trapdoor generator further comprises
either, if the selected value of integer j is provided as a setting in all stations of the cryptographic system,
means for transferring at least the modulus m and secret multiplier d to the message decryption station,
or, if the data transferred by the transfer means also comprise the selected value of integer j,
means for transferring at least the modulus m, secret multiplier d and integer j to the message decryption station,
and the message decryption station comprises
either, if the selected value of integer j is provided as a setting in all stations of the cryptographic system,
input means for being inputted at least the modulus m and secret multiplier d;
storage means for at least the inputted modulus m and secret multiplier d;
or, if the data transferred by the transfer means also comprise the selected value of integer j,
input means for being inputted at least the modulus m, secret multiplier d and integer j;
storage means for at least the inputted modulus m, secret multiplier d and integer j;
and the message decryption station further comprises
receiver means for receiving the pair of integers (w,z) representative of an encrypted message corresponding to the pair of integers (x,y);
means for computing integer a according to equation $$a = [(z^2/w) - w^2] \pmod{m}$$

in case the value j=4 has been selected and according to equation a=0 in case the value j=3 has been selected for the integer j at the trapdoor generator, in which latter case the means for computing integer a actually can be dispensed with; and
an elliptic-curve computation means for performing, on a point Q(w,z) of the elliptic curve whose coordinates are the pair of integers (w,z), an elliptic-curve computation $$P(x,y) = d \cdot Q(w,z)$$

using the value of integer a computed in the computing means to compute a point P(x,y) of the elliptic curve whose coordinates are the pair of integers (x,y) representative of a decrypted message.

If the system is used for user identification, it further comprises
a trusted authority device for issuing data allowing identification of a station of the cryptographic system; and
at least one identification device included in a station of the cryptographic system and equipped with storage means for the identification allowing data;
at least one verification device included in another station of the cryptographic system and adapted to cooperate with the identification device;
the trusted authority device being equipped with the second embodiment of the trapdoor generator and further comprising
means for selecting an identification data string I uniquely representative of an identity of an applicant for the identification device;
means for selecting a function f that assigns to any of the unique strings I a respective unique pair of integers (x,y) satisfying the conditions $0 \leq x < m$ and $0 \leq y < m$, whereby the integers (x,y) are representative of a point P(x,y)=f(I) of an elliptic curve;
an elliptic-curve computation means for performing on the point P(x,y) an elliptic-curve computation $$Q(s,t) = d \cdot P(x,y)$$

for computing a point Q(s,t) of the elliptic curve whose coordinates are a pair of integers (s,t) representative of an encrypted string corresponding to the identification data string I; and
transfer means for transferring at least the identification data string I, modulus m, public multiplier e, pair of integers (x,y) and pair of integers (s,t) to the storage means of the identification device for storage therein.

Preferably, if the system is used for user identification as described last, the function f is provided as a setting in all stations of the cryptographic system, or the data transferred by the transfer means also comprise the function f.

If the system is used for user identification as described above, then
if the data transferred by the transfer means also comprise the function f, then the trusted authority device further comprises transfer means for transferring the function f to
either a corresponding storage means provided in the verification device for locally storing the function f in the verification device;
or a public directory which can be interrogated by any station for locally storing the function f in the station;
and the identification device comprises
means for computing integer a according to equation $$a = [(y^2/x) - x^2] \pmod{m}$$

in case the value j=4 has been selected and according to equation a=0 in case the value j=3 has been selected for the integer j at the trapdoor generator, in which latter case the means for computing integer a actually can be dispensed with;
means for selecting a random integer r satisfying the condition $0 \leq r \leq l$ wherein l is an integer provided as a setting in the identification device and satisfying the condition $l < m$;
an elliptic-curve computation means for performing, on the point P(u,v) of the elliptic curve whose coordinates are the pair of integers (u,v), an elliptic-curve computation $$U(u_x, u_y) = r \cdot P(x,y)$$

for computing a point $U(u_x, u_y)$ of the elliptic curve whose coordinates are a pair of integers $(u_x, u_y)$;

an elliptic-curve computation means for performing, on the point $U(u_x,u_y)$ of the elliptic curve whose coordinates are the pair of integers $(u_x,u_y)$, an elliptic-curve computation $$V(v_x,v_y)=e \cdot U(u_x,u_y)$$

for computing a point $V(v_x,v_y)$ of the elliptic curve whose coordinates are a pair of integers $(v_x,v_y)$;

transmission means for transmitting the identification data string I and pair of integers $(v_x,v_y)$ for reception thereof at the other station including the verification device;

receiver means for receiving an integer k as a challenge from the other station including the verification device;

an elliptic-curve computation means for performing, on the point $Q(s,t)$ of the elliptic curve whose coordinates are the pair of integers $(s,t)$, an elliptic-curve computation $$W(w_x,w_y)=U(u_x,u_y)+k \cdot Q(s,t)$$

for computing a point $W(w_x,w_y)$ of the elliptic curve whose coordinates are a pair of integers $(w_x,w_y)$;

transmission means for transmitting the pair of integers $(w_x,w_y)$ for reception thereof at the other station including the verification device;

and if the data transferred by the transfer means also comprise the function f, and the trusted authority device comprises transfer means for transferring the function f to a corresponding storage means provided in the verification device for locally storing the function f in the verification device, then the verification device comprises input means for being inputted at least the function f from the trusted authority device by the transfer means thereof;

storage means for at least the transferred function f;

if the data transferred by the transfer means also comprise the function f, and the trusted authority device comprises transfer means for transferring the function f to a public directory which can be interrogated by any station for locally storing the function f in the station, then the verification device comprises means for interrogating a public directory for being transferred therefrom at least the function f;

storage means for at least the transferred function f;

and the verification device further comprises means for computing from the identification data string I according to the function f the pair of integers (x,y) representative of a point $P(x,y)=f(I)$ of the elliptic curve;

means for selecting a random integer k satisfying the condition $0 \leq k \leq (e-1)$;

transmission means for transmitting the random integer k for reception thereof at the station including the identification device as a challenge;

receiver means for receiving the pair of integers $(w_x,w_y)$ as a response to the challenge from the station including the identification device;

an elliptic-curve computation means for performing, on the point $W(w_x,w_y)$ of the elliptic curve whose coordinates are the pair of integers $(w_x,w_y)$, an elliptic-curve computation $$T1(t1_x,t1_y)=e \cdot W(w_x,w_y)$$

for computing a point $T1(t1_x,t1_y)$ of the elliptic curve whose coordinates are a pair of integers $(t1_x,t1_y)$;

an elliptic-curve computation means for performing, on the point $W(w_x,w_y)$ of the elliptic curve whose coordinates are the pair of integers $(w_x,w_y)$, an elliptic-curve computation $$T2(t2_x,t2_y)=V(v_x,v_y)+k \cdot P(x,y)$$

for computing a point $T2(t2_x,t2_y)$ of the elliptic curve whose coordinates are a pair of integers $(t2_x,t2_y)$; and means for comparing the pairs of integers $(t1_x,t1_y)$ and $(t2_x,t2_y)$ with each other so as to determine whether both test conditions $t1_x=t2_x$ and $t1_y=t2_y$ are satisfied by the pairs of integers $(t1_x,t1_y)$ and $(t2_x,t2_y)$.

Preferably, if the system is used for user identification as described last, the means for selecting a random integer k and the transmission means for transmitting the random integer k as a challenge are constructed for recurrent operation a plurality of times in the course of an identification session.

It will be understood that the above described embodiments are but examples from which it is possible to deviate without departing from the scope of the invention as defined in the appended claims.

I claim:

1. Cryptographic system comprised of at least one encryption station, at least one decryption station and a trapdoor generator, said trapdoor generator comprising means for selecting a multiplicity r of distinct prime numbers pi wherein i is an integer satisfying the conditions $1 \leq i \leq r$;

means for generating a modulus m that is a product of said prime numbers pi;

means for selecting a pair of integers (a,b) satisfying the conditions $0 \leq a < m$ and $0 \leq b < m$;

means for computing, for each prime number pi, a number N(pi) of distinct pairs of integers (x,y) satisfying the conditions $0 \leq x < pi$ and $0 \leq y < pi$ and further satisfying the condition $$y^2 = x^3 + a \cdot x + b \pmod{pi}$$

and for computing from said numbers N(pi) a sum value N(pi)+1 representative of an order of such an elliptic curve which is defined as the set of said pairs of integers (x,y);

means for computing a least common multiple $\mu$ of said sum values N(pi)+1;

means for selecting a public multiplier e which is relatively prime to $\mu$;

means for computing a secret multiplier d according to an equation $$d = 1/e \pmod{\mu};$$

and transfer means for transferring data comprising at least said modulus m, pair of integers (a,b) and public multiplier e to a corresponding storage means provided in the cryptographic system for locally storing said data therein, whereby the cryptographic system is provided with a trapdoor one-way function for a transformation whose trapdoor is the secret multiplier d.

2. Cryptographic system according to claim 1, wherein said corresponding storage means is a public directory which can be interrogated by any station of the cryptographic system for locally storing therein said data transferred from said trapdoor generator by said transfer means.

3. Cryptographic system according to claim 2, wherein the encryption station is a message encryption station which comprises means for interrogating a public directory for being transferred therefrom at least said modulus m, public multiplier e and integer j;

storage means for at least said transferred modulus m and public multiplier e and integer j;

message input means for being inputted a pair of integers (x,y) representative of a message, satisfying the conditions $0 \leq x < m$ and $0 \leq y < m$;

means for computing integer a according to equation $$a = [(y^2/x) - x^2] \pmod{m}$$

in case the value $j = 4$ has been selected and according to equation $a = 0$ in case the value $j = 3$ has been selected for said integer j at the trapdoor generator, in which latter case the means for computing integer a actually can be dispensed with;

an elliptic-curve computation means for performing, on a point P(x,y) of an elliptic curve which is representative of said integers (x,y), an elliptic-curve computation $$Q(w,z) = e \cdot P(x,y)$$

using the value of integer a computed in said computing means to compute a point Q(w,z) of said elliptic curve whose coordinates are a pair of integers (w,z) representative of an encrypted message corresponding to said pair of integers (x,y); and transmission means for transmitting said pair of integers (w,z) for reception thereof at a message decryption station;

whereby the message encryption station is capable of encrypting and transmitting a message allowing its decryption at a message receiving and decryption station.

4. Cryptographic system according to claim 2, wherein the encryption station is a message encryption station which comprises means for interrogating a public directory for being transferred therefrom at least said modulus m and public multiplier e;

storage means for at least said transferred modulus m and public multiplier e;

message input means for being inputted a pair of integers (x,y) representative of a message, satisfying the conditions $0 \leq x < m$ and $0 \leq y < m$;

means for computing integer a according to equation $$a = [(y^2/x) - x^2] \pmod{m}$$

in case the value $j = 4$ has been selected and according to equation $a = 0$ in case the value $j = 3$ has been selected for said integer j at the trapdoor generator, in which latter case the means for computing integer a actually can be dispensed with;

an elliptic-curve computation means for performing, on a point P(x,y) of an elliptic curve which is representative of said integers (x,y), an elliptic-curve computation $$Q(w,z) = e \cdot P(x,y)$$

using the value of integer a computed in said computing means to compute a point Q(w,z) of said elliptic curve whose coordinates are a pair of integers (w,z) representative of an encrypted message corresponding to said pair of integers (x,y); and transmission means for transmitting said pair of integers (w,z) for reception thereof at a message decryption station;

whereby the message encryption station is capable of encrypting and transmitting a message allowing its decryption at a message receiving and decryption station.

5. Cryptographic system according to claim 4, wherein the decryption station is a message decryption station which comprises said trapdoor generator;

receiver means for receiving said pair of integers (w,z) representative of an encrypted message corresponding to said pair of integers (x,y);

means for computing integer a according to equation $$a = [(z^2/w) - w^2] \pmod{m}$$

in case the value $j = 4$ has been selected and according to equation $a = 0$ in case the value $j = 3$ has been selected for said integer j at the trapdoor generator, in which latter case the means for computing integer a actually can be dispensed with; and an elliptic-curve computation means for performing, on a point Q(w,z) of said elliptic curve whose coordinates are said pair of integers (w,z), an elliptic-curve computation $$P(x,y) = d \cdot Q(w,z)$$

using the value of integer a computed in said computing means to compute a point P(x,y) of said elliptic curve whose coordinates are said pair of integers (x,y) representative of a decrypted message;

whereby the message decryption station is capable of receiving and decrypting a message.

6. Cryptographic system according to claim 4, wherein the decryption station is a message decryption station, the trapdoor generator further comprises means for transferring at least said modulus m and secret multiplier d to the message decryption station, and the message decryption station comprises input means for being inputted at least said modulus m and secret multiplier d;

storage means for at least said inputted modulus m and secret multiplier d;

receiver means for receiving said pair of integers (w,z) representative of an encrypted message corresponding to said pair of integers (x,y);

means for computing integer a according to equation $$a = [(z^2/w) - w^2] \pmod{m}$$

in case the value $j = 4$ has been selected and according to equation $a = 0$ in case the value $j = 3$ has been selected for said integer j at the trapdoor generator, in which latter case the means for computing integer a actually can be dispensed with; and an elliptic-curve computation means for performing, on a point Q(w,z) of said elliptic curve whose coordinates are said pair of integers (w,z), an elliptic-curve computation $$P(x,y)=d\cdot Q(w,z)$$

using the value of integer a computed in said computing means to compute a point P(x,y) of said elliptic curve whose coordinates are said pair of integers (x,y) representative of a decrypted message;

whereby the message decryption station is capable of receiving and decrypting a message.

7. Cryptographic system according to claim 4, wherein the decryption station is a message decryption station, the trapdoor generator further comprises means for transferring at least said modulus m, secret multiplier d and integer j to the message decryption station, and the message decryption station comprises input means for being inputted at least said modulus m, secret multiplier d and integer j;

storage means for at least said inputted modulus m, secret multiplier d and integer j;

receiver means for receiving said pair of integers (w,z) representative of an encrypted message corresponding to said pair of integers (x,y);

means for computing integer a according to equation $$a \equiv [(z^2/w) - w^2] \pmod{m}$$

in case the value j=4 has been selected and according to equation a=0 in case the value j=3 has been selected for said integer j at the trapdoor generator, in which latter case the means for computing integer a actually can be dispensed with; and an elliptic-curve computation means for performing, on a point Q(w,z) of said elliptic curve whose coordinates are said pair of integers (w,z), an elliptic-curve computation $$P(x,y)=d\cdot Q(w,z)$$

using the value of integer a computed in said computing means to compute a point P(x,y) of said elliptic curve whose coordinates are said pair of integers (x,y) representative of a decrypted message;

whereby the message decryption station is capable of receiving and decrypting a message.

8. Cryptographic system according to claim 1, wherein said corresponding storage means is included in a station of the cryptographic system for locally storing therein said data transferred from said trapdoor generator by said transfer means.

9. Cryptographic system according to claim 8, wherein the encryption station is a message encryption station which comprises input means for being inputted at least said modulus m and public multiplier e transferred from said trapdoor generator by said transfer means;

storage means for at least said transferred modulus m and public multiplier e;

message input means for being inputted a pair of integers (x,y) representative of a message, satisfying the conditions $0 \leq x < m$ and $0 \leq y < m$;

means for computing integer a according to equation $$a \equiv [(y^2/x) - x^2] \pmod{m}$$

in case the value j=4 has been selected and according to equation a=0 in case the value j=3 has been selected for said integer j at the trapdoor generator, in which latter case the means for computing integer a actually can be dispensed with;

an elliptic-curve computation means for performing, on a point P(x,y) of said elliptic curve which is representative of said integers (x,y), an elliptic-curve computation $$Q(w,z)=e\cdot P(x,y)$$

using the value of integer a computed in said computing means to compute a point Q(w,z) of said elliptic curve whose coordinates are said pair of integers (w,z) representative of an encrypted message corresponding to said pair of integers (x,y); and transmission means for transmitting said pair of integers (w,z) for reception thereof at a message decryption station;

whereby the message encryption station is capable of encrypting and transmitting a message allowing its decryption at a message receiving and decryption station.

10. Cryptographic system according to claim 8, wherein the encryption station is a message encryption station which comprises input means for being inputted at least said modulus m, public multiplier e and integer j transferred from said trapdoor generator by said transfer means;

storage means for at least said transferred modulus m, public multiplier e and integer j;

message input means for being inputted a pair of integers (x,y) representative of a message, satisfying the conditions $0 \leq x < m$ and $0 \leq y < m$;

means for computing integer a according to equation $$a \equiv [(y^2/x) - x^2] \pmod{m}$$

in case the value j=4 has been selected and according to equation a=0 in case the value j=3 has been selected for said integer j at the trapdoor generator, in which latter case the means for computing integer a actually can be dispensed with;

an elliptic-curve computation means for performing, on a point P(x,y) of said elliptic curve which is representative of said integers (x,y), an elliptic-curve computation $$Q(w,z)=e\cdot P(x,y)$$

using the value of integer a computed in said computing means to compute a point Q(w,z) of said elliptic curve whose coordinates are said pair of integers (w,z) representative of an encrypted message corresponding to said pair of integers (x,y); and transmission means for transmitting said pair of integers (w,z) for reception thereof at a message decryption station;

whereby the message encryption station is capable of encrypting and transmitting a message allowing its decryption at a message receiving and decryption station.

11. Cryptographic system according to claim 1, wherein the encryption station is a signature encryption station which comprises
said trapdoor generator;
means for selecting an integer x subjected to predetermined conditions provided as a setting in all stations of the cryptographic system;
a message-to-elliptic-curve converter means for computing from said integer x a pair of integers (s,t) such that
said integer s satisfies a predetermined relationship to said integer x, which relationship is provided as a setting in all stations of the cryptographic system, and
said pair of integers (s,t) satisfies the condition $$t^2 = s^3 + a \cdot s + b \pmod{m}$$

whereby said integers (s,t) are representative of a point Q(s,t) of said elliptic curve;
an elliptic-curve computation means for performing on said point Q(s,t) an elliptic-curve computation $$P(u,v) = d \cdot Q(s,t)$$

for computing a point P(u,v) of said elliptic curve whose coordinates are a pair of integers (u,v) representative of an encrypted signature corresponding to said integer x; and
transmission means for transmitting said pair of integers (u,v) for reception thereof at a signature decryption station;
whereby the signature encryption station is capable of generating and transmitting to a corresponding signature decryption station a signature allowing its authentication at the signature decryption station.

12. Cryptographic system according to claim 11, wherein said message-to-elliptic curve converter means comprises
means for computing said integer s from said integer x by assigning to said integer s the smallest value which satisfies the condition $$s \geq x$$

and for which the equation $$s^3 + a \cdot s + b \pmod{m}$$

evaluates to a quadratic residue (mod $m$); and
means for computing said integer t as a square root (mod m) of said quadratic residue (mod m).

13. Cryptographic system according to claim 12, wherein said integer x is selected such that its binary representation has a predetermined number of least significant bits all having a same binary value.

14. Cryptographic system according to claim 13, wherein said authentication means comprises means for determining whether each of the t least significant bits of integer s has said one and the same predetermined binary value.

15. Cryptographic system according to claim 11, wherein said integer x is selected to have a predetermined inherent redundancy.

16. Cryptographic system according to claim 11, wherein the decryption station is a signature decryption station which comprises
receiver means for receiving said pair of integers (u,v) representative of an encrypted signature corresponding to said integer x;
means for interrogating a public directory for being transferred therefrom at least said modulus m, said pair of integers (a,b) and said public multiplier e;
storage means for at least said transferred modulus m, pair of integers (a,b) and public multiplier e;
an elliptic-curve computation means for performing, on said point P(u,v) of said elliptic curve whose coordinates are said pair of integers (u,v), an elliptic-curve computation $$Q(s,t) = e \cdot P(u,v)$$

for computing a point Q(s,t) of said elliptic curve whose coordinates are said pair of integers (s,t); and
an authentication means comprising
means for computing a decrypted signature from at least said integer s in consideration of said predetermined relationship between said integer s and said integer x, and
means for determining whether said decrypted signature satisfies said predetermined conditions to which integer x is subjected, in which case said decrypted signature is proved authentic;
whereby the signature decryption station is capable of decrypting and authenticating an encrypted signature received from the corresponding signature encryption station.

17. Cryptographic system according to claim 16, wherein said authentication means comprises means for determining whether each of the t least significant bits of integer s has said one and the same predetermined binary value.

18. Cryptographic system according to claim 11, wherein the decryption station is a signature decryption station which comprises
receiver means for receiving said pair of integers (u,v) representative of an encrypted signature corresponding to said integer x;
input means for being inputted at least said modulus m, pair of integers (a,b) and said public multiplier e transferred from said trapdoor generator by said transfer means;
storage means for at least said transferred modulus m, pair of integers (a,b) and public multiplier e;
an elliptic-curve computation means for performing, on said point P(u,v) of said elliptic curve whose coordinates are said pair of integers (u,v), an elliptic-curve computation $$Q(s,t) = e \cdot P(u,v)$$

for computing a point Q(s,t) of said elliptic curve whose coordinates are said pair of integers (s,t); and
an authentication means comprising
means for computing a decrypted signature from at least said integer s in consideration of said predetermined relationship between said integer s and said integer x, and
means for determining whether said decrypted signature satisfies said predetermined conditions to which integer x is subjected, in which case said decrypted signature is proved authentic;

whereby the signature decryption station is capable of decrypting and authenticating an encrypted signature received from the corresponding signature encryption station.

19. Cryptographic system according to claim 1, wherein the encryption station is a signature encryption station which comprises said trapdoor generator;
input means for being inputted an integer x subjected to predetermined conditions provided as a setting in all stations of the cryptographic system;
storage means for said inputted integer x;
a message-to-elliptic-curve converter means for computing from said integer x a pair of integers (s,t) such that
said integer s satisfies a predetermined relationship to said integer x, which relationship is provided as a setting in all stations of the cryptographic system, and
said pair of integers (s,t) satisfies the condition $$t^2 \equiv s^3 + a \cdot s + b \pmod{m}$$

whereby said integers (s,t) are representative of a point Q(s,t) of said elliptic curve;
an elliptic-curve computation means for performing on said point Q(s,t) an elliptic-curve computation $$P(u,v) = d \cdot Q(s,t)$$

for computing a point P(u,v) of said elliptic curve whose coordinates are a pair of integers (u,v) representative of an encrypted signature corresponding to said integer x; and
transmission means for transmitting said pair of integers (u,v) for reception thereof at a signature decryption station;
whereby the signature encryption station is capable of generating and transmitting to a corresponding signature decryption station a signature allowing its authentication at the signature decryption station.

20. Cryptographic system according to claim 1, wherein
the encryption station is a signature encryption station,
the trapdoor generator further comprises means for transferring at least said multiplicity r of distinct prime numbers pi, modulus m, pair of integers (a,b) and secret multiplier d to the signature encryption station, and
the signature encryption station comprises
input means for being inputted at least said multiplicity r of distinct prime numbers pi, modulus m, pair of integers (a,b) and secret multiplier d;
storage means for at least said inputted multiplicity r of distinct prime numbers pi, modulus m, pair of integers (a,b) and secret multiplier d;
means for selecting an integer x subjected to predetermined conditions provided as a setting in all stations of the cryptographic system;
a message-to-elliptic-curve converter means for computing from said integer x a pair of integers (s,t) such that
said integer s satisfies a predetermined relationship to said integer x, which relationship is provided as a setting in all stations of the cryptographic system, and
said pair of integers (s,t) satisfies the condition $$t^2 \equiv s^3 + a \cdot s + b \pmod{m}$$

whereby said integers (s,t) are representative of a point Q(s,t) of said elliptic curve;
an elliptic-curve computation means for performing on said point Q(s,t) an elliptic-curve computation $$P(u,v) = d \cdot Q(s,t)$$

for computing a point P(u,v) of said elliptic curve whose coordinates are a pair of integers (u,v) representative of an encrypted signature corresponding to said integer x; and
transmission means for transmitting said pair of integers (u,v) for reception thereof at a signature decryption station;
whereby the signature encryption station is capable of generating and transmitting to a corresponding signature decryption station a signature allowing its authentication at the signature decryption station.

21. Cryptographic system according to claim 1, wherein
the encryption station is a signature encryption station,
the trapdoor generator further comprises means for transferring at least said multiplicity r of distinct prime numbers pi, modulus m, pair of integers (a,b) and secret multiplier d to the signature encryption station, and
the signature encryption station comprises
input means for being inputted at least said multiplicity r of distinct prime numbers pi, modulus m, pair of integers (a,b) and secret multiplier d, and further for being inputted an integer x subjected to predetermined conditions provided as a setting in all stations of the cryptographic system;
storage means for at least said inputted multiplicity r of distinct prime numbers pi, modulus m, pair of integers (a,b), secret multiplier d and integer x;
a message-to-elliptic-curve converter means for computing from said integer x a pair of integers (s,t) such that
said integer s satisfies a predetermined relationship to said integer x, which relationship is provided as a setting in all stations of the cryptographic system, and
said pair of integers (s,t) satisfies the condition $$t^2 \equiv s^3 + a \cdot s + b \pmod{m}$$

whereby said integers (s,t) are representative of a point Q(s,t) of said elliptic curve;
an elliptic-curve computation means for performing on said point Q(s,t) an elliptic-curve computation $$P(u,v) = d \cdot Q(s,t)$$

for computing a point P(u,v) of said elliptic curve whose coordinates are a pair of integers (u,v) representative of an encrypted signature corresponding to said integer x; and
transmission means for transmitting said pair of integers (u,v) for reception thereof at a signature decryption station;
whereby the signature encryption station is capable of generating and transmitting to a corresponding signature decryption station a signature allowing its authentication at the signature decryption station.

22. Cryptographic system comprised of at least one encryption station, at least one decryption station and a trapdoor generator, said trapdoor generator comprising
means for selecting a multiplicity r of distinct prime numbers pi each having a respectively corresponding sum value (pi+1) that satisfies the condition $$(pi+1) \equiv 0 \pmod{j}$$

wherein i is an integer satisfying the conditions $1 \leq i \leq r$ and j is an integer whose value is selected from 3 or 4;
means for generating a modulus m that is a product of said prime numbers pi;
means for computing the least common multiple $\mu$ of said numbers (pi+1);
means for selecting a public multiplier e which is relatively prime to $\mu$;
means for computing a secret multiplier d according to an equation $$d = 1/e \pmod{\mu};$$

and
transfer means for transferring data comprising at least said modulus m and public multiplier e to a corresponding storage means provided in the cryptographic system for locally storing said data therein,
whereby the cryptographic system is provided with a trapdoor one-way function for a transmission whose trapdoor is the secret multiplier d.

23. Cryptographic system according to claim 22, wherein said selected value of integer j is provided as a setting in all stations of the cryptographic system.

24. Cryptographic system according to claim 23, wherein the decryption station is a signature decryption station which comprises
means for interrogating a public directory for being transferred therefrom at least said modulus m and public multiplier e;
storage means for at least said transferred modulus m and public multiplier e;
receiver means for receiving said pairs of integers (w,z) representative of an encrypted message corresponding to said pair of integers (x,y);
means for computing integer a according to equation $$a = [(z^2/w) - w^2] \pmod{m}$$

in case the value j=4 has been selected and according to equation a=0 in case the value j=3 has been selected for said integer j at the trapdoor generator, in which latter case the means for computing integer a actually can be dispensed with;
an elliptic-curve computation means for performing, on a point Q(w,z) of said elliptic curve whose coordinates are said pair of integers (w,z), an elliptic-curve computation $$P(x,y) = e \cdot Q(w,z)$$

using the value of integer a computed in said computing means to compute a point P(x,y) of said elliptic curve whose coordinates are said pair of integers (x,y) representative of a decrypted message; and
an authentication means for determining whether said elliptic-curve computation means has successfully computed a pair of integers (x,y) satisfying the predetermined conditions provided as a setting in all stations of the cryptographic system; whereby the signature decryption station is capable of decrypting and authenticating an encrypted signature received from the corresponding signature encryption station.

25. Cryptographic system according to claim 23, wherein the decryption station is a signature decryption station which comprises
input means for being inputted at least said modulus m and public multiplier e transferred from said trapdoor generator by said transfer means;
storage means for at least said transferred modulus m and public multiplier e;
receiver means for receiving said pairs of integers (w,z) representative of an encrypted message corresponding to said pair of integers (x,y);
means for computing integer a according to equation $$a = [(z^2/w) - w^2] \pmod{m}$$

in case the value j=4 has been selected and according to equation a=0 in case the value j=3 has been selected for said integer j at the trapdoor generator, in which latter case the means for computing integer a actually can be dispensed with;
an elliptic-curve computation means for performing, on a point Q(w,z) of said elliptic curve whose coordinates are said pair of integers (w,z), an elliptic-curve computation $$P(x,y) = e \cdot Q(w,z)$$

using the value of integer a computed in said computing means to compute a point P(x,y) of said elliptic curve whose coordinates are said pair of integers (x,y) representative of a decrypted message; and
an authentication means for determining whether said elliptic-curve computation means has successfully computed a pair of integers (x,y) satisfying the predetermined conditions provided as a setting in all stations of the cryptographic system;
whereby the signature decryption station is capable of decrypting and authenticating an encrypted signature received from the corresponding signature encryption station.

26. Cryptographic system according to claim 23, wherein
the decryption station is a message decryption station,
the trapdoor generator further comprises means for transferring at least said modulus m and secret multiplier d to the message decryption station, and
the message decryption station comprises
input means for being inputted at least said modulus m and secret multiplier d;
storage means for at least said inputted modulus m and secret multiplier d;
receiver means for receiving said pair of integers (w,z) representative of an encrypted message corresponding to said pair of integers (x,y);
means for computing integer a according to equation $$a \equiv [(z^2/w) - w^2] \pmod{m}$$

in case the value $j=4$ has been selected and according to equation $a=0$ in case the value $j=3$ has been selected for said integer j at the trapdoor generator, in which latter case the means for computing integer a actually can be dispensed with; and an elliptic-curve computation means for performing, on a point $Q(w,z)$ of said elliptic curve whose coordinates are said pair of integers $(w,z)$, an elliptic-curve computation $$P(x,y) = d \cdot Q(w,z)$$

using the value of integer a computed in said computing means to compute a point $P(x,y)$ of said elliptic curve whose coordinates are said pair of integers $(x,y)$ representative of a decrypted message;

whereby the message decryption station is capable of receiving and decrypting a message.

27. Cryptographic system according to claim 23, wherein the encryption station is a message encryption station which comprises means for interrogating a public directory for being transferred therefrom at least said modulus m and public multiplier e;

storage means for at least said transferred modulus m and public multiplier e;

message input means for being inputted a pair of integers $(x,y)$ representative of a message, satisfying the conditions $0 \leq x < m$ and $0 \leq y < m$;

means for computing integer a according to equation $$a \equiv [(y^2/x) - x^2] \pmod{m}$$

in case the value $j=4$ has been selected and according to equation $a=0$ in case the value $j=3$ has been selected for said integer j at the trapdoor generator, in which latter case the means for computing integer a actually can be dispensed with;

an elliptic curve computation means for performing, on a point $P(x,y)$ of an elliptic curve which is representative of said integers $(x,y)$, an elliptic-curve computation $$Q(w,z) = e \cdot P(x,y)$$

using the value of integer a computed in said computing means to compute a point $Q(w,z)$ of said elliptic curve whose coordinates are a pair of integers $(w,z)$ representative of an encrypted message corresponding to said pair of integers $(x,y)$; and transmission means for transmitting said pair of integers $(w,z)$ for reception thereof at a message decryption station;

whereby the message encryption station is capable of encrypting and transmitting a message allowing its decryption at a message receiving and decryption station.

28. Cryptographic system according to claim 23, wherein the encryption station is a message encryption station which comprises input means for being inputted at least said modulus m and public multiplier e transferred from said trapdoor generator by said transfer means;

storage means for at least said transferred modulus m and public multiplier e;

message input means for being inputted a pair of integers $(x,y)$ representative of a message, satisfying the conditions $0 \leq x < m$ and $0 \leq y < m$;

means for computing integer a according to equation $$a \equiv [(y^2/x) - x^2] \pmod{m}$$

in case the value $j=4$ has been selected and according to equation $a=0$ in case the value $j=3$ has been selected for said integer j at the trapdoor generator, in which latter case the means for computing integer a actually can be dispensed with;

an elliptic-curve computation means for performing, on a point $P(x,y)$ of said elliptic curve which is representative of said integers $(x,y)$, an elliptic-curve computation $$Q(w,z) = e \cdot P(x,y)$$

using the value of integer a computed in said computing means to compute a point $Q(w,z)$ of said elliptic curve whose coordinates are said pair of integers $(w,z)$ representative of an encrypted message corresponding to said pair of integers $(x,y)$; and transmission means for transmitting said pair of integers $(w,z)$ for reception thereof at a message decryption station;

whereby the message encryption station is capable of encrypting and transmitting a message allowing its decryption at a message receiving and decryption station.

29. Cryptographic system according to claim 22, wherein said data transferred by said transfer means also comprise said selected value of integer j.

30. Cryptographic system according to claim 29, wherein the decryption station is a signature decryption station which comprises means for interrogating a public directory for being transferred therefrom at least said modulus m, public multiplier e and integer j;

storage means for at least said transferred modulus m and public multiplier e and integer j;

receiver means for receiving the pair of integers $(w,z)$ representative of an encrypted message corresponding to the pair of integers $(x,y)$;

means for computing integer a according to equation $$a \equiv [(z^2/w) - w^2] \pmod{m}$$

in case the value $j=4$ has been selected and according to equation $a=0$ in case the value $j=3$ has been selected for the integer j at the trapdoor generator, in which latter case the means for computing integer a actually can be dispensed with;

an elliptic-curve computation means for performing, on a point $Q(w,z)$ of the elliptic curve whose coordinates are the pair of integers $(w,z)$, an elliptic-curve computation $$P(x,y) = e \cdot Q(w,z)$$

using the value of integer a computed in the computing means to compute a point $P(x,y)$ of the elliptic curve whose coordinates are the pair of integers $(x,y)$ representative of a decrypted message; and an authentication means for determining whether said elliptic-curve computation means has successfully computed a pair of integers $(x,y)$ satisfying the predetermined conditions provided as a setting in all stations of the cryptographic system;

whereby the signature decryption station is capable of decrypting and authenticating an encrypted signature received from the corresponding signature encryption station.

31. Cryptographic system according to claim 29, wherein the decryption station is a signature decryption station which comprises input means for being inputted at least the modulus m, public multiplier e and integer j transferred from said trapdoor generator by said transfer means;

storage means for at least the transferred modulus m, public multiplier e and integer j;

receiver means for receiving said pair of integers (w,z) representative of an encrypted message corresponding to the pair of integers (x,y);

means for computing integer a according to equation $$a = [(z^2/w) - w^2] \pmod{m}$$

in case the value j=4 has been selected and according to equation a=0 in case the value j=3 has been selected for the integer j at the trapdoor generator, in which latter case the means for computing integer a actually can be dispensed with;

an elliptic-curve computation means for performing, on a point Q(w,z) of the elliptic curve whose coordinates are the pair of integers (w,z), an elliptic-curve computation $$P(x,y) = e \cdot Q(w,z)$$

using the value of integer a computed in the computing means to compute a point P(x,y) of the elliptic curve whose coordinates are the pair of integers (x,y) representative of a decrypted message; and an authentication means for determining whether said elliptic-curve computation means has successfully computed a pair of integers (x,y) satisfying the predetermined conditions provided as a setting in all stations of the cryptographic system;

whereby the signature decryption station is capable of decrypting and authenticating an encrypted signature received from the corresponding signature encryption station.

32. Cryptographic system according to claim 29, wherein the decryption station is a message decryption station, the trapdoor generator further comprises means for transferring at least said modulus m, secret multiplier d and integer j to the message decryption station, and the message decryption station comprises input means for being inputted at least said modulus m, secret multiplier d and integer j;

storage means for at least said transferred modulus m, secret multiplier d and integer j;

receiver means for receiving the pair of integers (w,z) representative of an encrypted message corresponding to the pair of integers (x,y);

means for computing integer a according to equation $$a = [(z^2/w) - w^2] \pmod{m}$$

in case the value j=4 has been selected and according to equation a=0 in case the value j=3 has been selected for the integer j at the trapdoor generator, in which latter case the means for computing integer a actually can be dispensed with;

an elliptic-curve computation means for performing, on a point Q(w,z) of the elliptic curve whose coordinates are the pair of integers (w,z), an elliptic-curve computation $$P(x,y) = e \cdot Q(w,z)$$

using the value of integer a computed in the computing means to compute a point P(x,y) of the elliptic curve whose coordinates are the pair of integers (x,y) representative of a decrypted message;

whereby the message decryption station is capable of receiving and decrypting a message.

33. Cryptographic system according to claim 29, wherein the encryption station is a message encryption station which comprises means for interrogating a public directory for being transferred therefrom at least said modulus m, public multiplier e and integer j;

storage means for at least the transferred modulus m and public multiplier e and integer j;

message input means for being inputted a pair of integers (x,y) representative of a message, satisfying the conditions $0 \leq x < m$ and $0 \leq y < m$;

means for computing integer a according to equation $$a = [(y^2/x) - x^2] \pmod{m}$$

in case the value j=4 has been selected and according to equation a=0 in case the value j=3 has been selected for the integer j at the trapdoor generator, in which latter case the means for computing integer a actually can be dispensed with;

an elliptic-curve computation means for performing, on a point P(x,y) of an elliptic curve which is representative of the integers (x,y), an elliptic-curve computation $$Q(w,z) = e \cdot P(x,y)$$

using the value of integer a computed in the computing means to compute a point Q(w,z) of the elliptic curve whose coordinates are a pair of integers (w,z) representative of an encrypted message corresponding to the pair of integers (x,y); and transmission means for transmitting the pair of integers (w,z) for reception thereof at a message decryption station;

whereby the message encryption station is capable of encrypting and transmitting a message allowing its decryption at a message receiving and decryption station.

34. Cryptographic system according to claim 29, wherein the encryption station is a message encryption station which comprises input means for being inputted at least said modulus m, public multiplier e and integer j transferred from said trapdoor generator by said transfer means;

storage means for at least said transferred modulus m, public multiplier e and integer j;

message input means for being inputted a pair of integers (x,y) representative of a message, satisfying the conditions $0 \leq x < m$ and $0 \leq y < m$;

means for computing integer a according to equation $$a = [(y^2/x) - x^2] \pmod{m}$$

in case the value j=4 has been selected and according to equation a=0 in case the value j=3 has been selected for said integer j at the trapdoor generator, in which latter case the means for computing integer a actually can be dispensed with;

an elliptic curve computation means for performing, on a point P(x,y) of an elliptic curve which is representative of said integers (x,y), an elliptic-curve computation $$Q(w,z) = e \cdot P(x,y)$$

using the value of integer a computed in said computing means to compute a point Q(w,z) of said elliptic curve whose coordinates are a pair of integers (w,z) representative of an encrypted message corresponding to said pair of integers (x,y); and transmission means for transmitting said pair of integers (w,z) for reception thereof at a message decryption station;

whereby the message encryption station is capable of encrypting and transmitting a message allowing its decryption at a message receiving and decryption station.

35. Cryptographic system according to claim 22, wherein the encryption station is a signature encryption station which comprises said trapdoor generator;

means for selecting a pair of integers (x,y) satisfying the conditions $0 \leq x < m$ and $0 \leq y < m$ and further subjected to predetermined conditions provided as a setting in all stations of the cryptographic system;

means for computing integer a according to equation $$a \equiv [(y^2/x) - x^2] \pmod{m}$$

in case the value j=4 has been selected and according to equation a=0 in case the value j=3 has been selected for said integer j at the trapdoor generator, in which latter case the means for computing integer a actually can be dispensed with;

an elliptic-curve computation means for performing, on a point P(x,y) of an elliptic curve which point is representative of said integers (x,y), an elliptic-curve computation $$Q(w,z) = d \cdot P(x,y)$$

using the value of integer a computed in said computing means to compute a point Q(w,z) of said elliptic curve whose coordinates are a pair of integers (w,z) representative of an encrypted signature corresponding to said pair of integers (x,y); and transmission means for transmitting said pair of integers (w,z) for reception thereof at a signature decryption station;

whereby the signature encryption station is capable of generating and transmitting to a corresponding signature decryption station a signature allowing its authentication at the signature decryption station.

36. Cryptographic system according to claim 35, wherein the decryption station is a signature decryption station which comprises means for interrogating a public directory for being transferred therefrom at least said modulus m and public multiplier e;

storage means for at least said transferred modulus m and public multiplier e;

message input means for being inputted a pair of integers (w,z) representative of an encrypted message corresponding to said pair of integers (x,y);

means for computing integer a according to equation $$a \equiv [(z^2/w) - w^2] \pmod{m}$$

in case the value j=4 has been selected and according to equation a=0 in case the value j=3 has been selected for said integer j at the trapdoor generator, in which latter case the means for computing integer a actually can be dispensed with;

an elliptic-curve computation means for performing, on a point Q(w,z) of the elliptic curve whose coordinates are the pair of integers (w,z), an elliptic-curve computation $$P(x,y) = e \cdot Q(w,z)$$

using the value of integer a computed in the computing means to compute a point P(x,y) of the elliptic curve whose coordinates are the pair of integers (x,y) representative of a decrypted message; and an authentication means for determining whether said elliptic-curve computation means has successfully computed a pair of integers (x,y) satisfying the predetermined conditions provided as a setting in all stations of the cryptographic system;

whereby the signature decryption station is capable of decrypting and authenticating an encrypted signature received from the corresponding signature encryption station.

37. Cryptographic system according to claim 35, wherein the decryption station is a signature decryption station which comprises input means for being inputted at least said modulus m and public multiplier e transferred from said trapdoor generator by said transfer means;

storage means for at least said transferred modulus m and public multiplier e;

receiver means for receiving said pair of integers (w,z) representative of an encrypted message corresponding to said pair of integers (x,y);

means for computing integer a according to equation $$a \equiv [(z^2/w) - w^2] \pmod{m}$$

in case the value j=4 has been selected and according to equation a=0 in case the value j=3 has been selected for said integer j at the trapdoor generator, in which latter case the means for computing integer a actually can be dispensed with;

an elliptic-curve computation means for performing, on a point Q(w,z) of said elliptic curve whose coordinates are said pair of integers (w,z), an elliptic-curve computation $$P(x,y) = d \cdot Q(w,z)$$

using the value of integer a computed in said computing means to compute a point P(x,y) of said elliptic curve whose coordinates are said pair of integers (x,y) representative of a decrypted message; and an authentication means for determining whether said elliptic-curve computation means has successfully computed a pair of integers (x,y) satisfying the predetermined conditions provided as a setting in all stations of the cryptographic system;

whereby the signature decryption station is capable of decrypting and authenticating an encrypted signature received from the corresponding signature encryption station.

38. Cryptographic system according to claim 35, wherein the decryption station is a signature decryption station which comprises means for interrogating a public directory for being transferred therefrom at least said modulus m, public multiplier e and integer j;

storage means for at least said transferred modulus m, public multiplier e and integer j;

receiver means for receiving the pair of integers (w,z) representative of an encrypted message corresponding to the pair of integers (x,y);

means for computing integer a according to equation $$a = [(z^2/w) - w^2] \pmod{m}$$

in case the value j=4 has been selected and according to equation a=0 in case the value j=3 has been selected for the integer j at the trapdoor generator, in which latter case the means for computing integer a actually can be dispensed with;

an elliptic-curve computation means for performing, on a point Q(w,z) of the elliptic curve whose coordinates are the pair of integers (w,z), an elliptic-curve computation $$P(x,y) = e \cdot Q(w,z)$$

using the value of integer a computed in the computing means to compute a point P(x,y) of the elliptic curve whose coordinates are the pair of integers (x,y) representative of a decrypted message; and an authentication means for determining whether said elliptic-curve computation means has successfully computed a pair of integers (x,y) satisfying the predetermined conditions provided as a setting in all stations of the cryptographic system;

whereby the signature decryption station is capable of decrypting and authenticating an encrypted signature received from the corresponding signature encryption station.

39. Cryptographic system according to claim 35, wherein the decryption station is a signature decryption station which comprises input means for being inputted at least the modulus m, public multiplier e and integer j transferred from said trapdoor generator by said transfer means;

storage means for at least the transferred modulus m, public multiplier e and integer j;

receiver means for receiving said pair of integers (w,z) representative of an encrypted message corresponding to the pair of integers (x,y);

means for computing integer a according to equation $$a = [(z^2/w) - w^2] \pmod{m}$$

in case the value j=4 has been selected and according to equation a=0 in case the value j=3 has been selected for the integer j at the trapdoor generator, in which latter case the means for computing integer a actually can be dispensed with;

an elliptic-curve computation means for performing, on a point Q(w,z) of the elliptic curve whose coordinates are the pair of integers (w,z), an elliptic-curve computation $$P(x,y) = e \cdot Q(w,z)$$

using the value of integer a computed in the computing means to compute a point P(x,y) of the elliptic curve whose coordinates are the pair of integers (x,y) representative of a decrypted message; and an authentication means for determining whether said elliptic-curve computation means has successfully computed a pair of integers (x,y) satisfying the predetermined conditions provided as a setting in all stations of the cryptographic system;

whereby the signature decryption station is capable of decrypting and authenticating an encrypted signature received from the corresponding signature encryption station.

40. Cryptographic system according to claim 22, wherein the encryption station is a signature encryption station which comprises said trapdoor generator;

input means for being inputted a pair of integers (x,y) satisfying the conditions $0 \leq x < m$ and $0 \leq y < m$ and further subjected to predetermined conditions provided as a setting in all stations of the cryptographic system;

storage means for said inputted pair of integers (x,y);

means for computing integer a according to equation $$a = [(y^2/x) - x^2] \pmod{m}$$

in case the value j=4 has been selected and according to equation a=0 in case the value j=3 has been selected for said integer j at the trapdoor generator, in which latter case the means for computing integer a actually can be dispensed with;

an elliptic-curve computation means for performing, on a point P(x,y) of an elliptic curve which is representative of said integers (x,y), an elliptic-curve computation $$Q(w,z) = d \cdot P(x,y)$$

using the value of integer a computed in said computing means to compute a point Q(w,z) of said elliptic curve whose coordinates are a pair of integers (w,z) representative of an encrypted signature corresponding to said pair of integers (x,y); and transmission means for transmitting said pair of integers (w,z) for reception thereof at a signature decryption station;

whereby the signature encryption station is capable of generating and transmitting to a corresponding signature decryption station a signature allowing its authentication at the signature decryption station.

41. Cryptographic system according to claim 22, wherein the encryption station is a signature encryption station, the trapdoor generator further comprises means for transferring at least said multiplicity r of distinct prime numbers pi, modulus m and secret multiplier d to the signature encryption station, and the signature encryption station comprises input means for being inputted at least said multiplicity r of distinct prime numbers pi, modulus m and secret multiplier d;

storage means for at least said inputted multiplicity r of distinct prime numbers pi, modulus m and secret multiplier d;

means for selecting a pair of integers (x,y) satisfying the conditions $0 \leq x < m$ and $0 \leq y < m$ and further subjected to predetermined conditions provided as a setting in all stations of the cryptographic system;

means for computing integer a according to equation $$a = [(y^2/x) - x^2] \pmod{m}$$

in case the value $j=4$ has been selected and according to equation $a=0$ in case the value $j=3$ has been selected for said integer j at the trapdoor generator, in which latter case the means for computing integer a actually can be dispensed with;

an elliptic-curve computation means for performing, on a point P(x,y) of an elliptic curve which point is representative of said integers (x,y), an elliptic-curve computation $$Q(w,z) = d \cdot P(x,y)$$

using the value of integer a computed in said computing means to compute a point Q(w,z) of said elliptic curve whose coordinates are a pair of integers (w,z) representative of an encrypted signature corresponding to said pair of integers (x,y); and transmission means for transmitting said pair of integers (w,z) for reception thereof at a signature decryption station;

whereby the signature encryption station is capable of generating and transmitting to a corresponding signature decryption station a signature allowing its authentication at the signature decryption station.

42. Cryptographic system according to claim 22, wherein the encryption station is a signature encryption station, the trapdoor generator further comprises means for transferring at least said multiplicity r of distinct prime numbers pi, modulus m and secret multiplier d to the signature encryption station, and the signature encryption station comprises input means for being inputted at least said multiplicity r of distinct prime numbers pi, modulus m and secret multiplier d, and further for being inputted a pair of integers (x,y) satisfying the conditions $0 \leq x < m$ and $0 \leq y < m$ and further subjected to predetermined conditions provided as a setting in all stations of the cryptographic system;

storage means for at least said inputted multiplicity r of distinct prime numbers pi, modulus m, secret multiplier d and pair of integers (x,y);

means for computing integer a according to equation $$a = [(y^2/x) - x^2] \pmod{m}$$

in case the value $j=4$ has been selected and according to equation $a=0$ in case the value $j=3$ has been selected for said integer j at the trapdoor generator, in which latter case the means for computing integer a actually can be dispensed with;

an elliptic-curve computation means for performing, on a point P(x,y) of an elliptic curve which is representative of said integers (x,y), an elliptic-curve computation $$Q(w,z) = d \cdot P(x,y)$$

using the value of integer a computed in said computing means to compute a point Q(w,z) of said elliptic curve whose coordinates are a pair of integers (w,z) representative of an encrypted signature corresponding to said pair of integers (x,y); and transmission means for transmitting said pair of integers (w,z) for reception thereof at a signature decryption station;

whereby the signature encryption station is capable of generating and transmitting to a corresponding signature decryption station a signature allowing its authentication at the signature decryption station.

43. Cryptographic system according to claim 22, wherein the decryption station is a message decryption station which comprises said trapdoor generator;

receiver means for receiving said pair of integers (w,z) representative of an encrypted message corresponding to said pair of integers (x,y);

means for computing integer a according to equation $$a = [(z^2/w) - w^2] \pmod{m}$$

in case the value $j=4$ has been selected and according to equation $a=0$ in case the value $j=3$ has been selected for said integer j at the trapdoor generator, in which latter case the means for computing integer a actually can be dispensed with; and an elliptic-curve computation means for performing, on a point Q(w,z) of said elliptic curve whose coordinates are said pair of integers (w,z), an elliptic-curve computation $$P(x,y) = d \cdot Q(w,z)$$

using the value of integer a computed in said computing means to compute a point P(x,y) of said elliptic curve whose coordinates are said pair of integers (x,y) representative of a decrypted message;

whereby the message decryption station is capable of receiving and decrypting a message.

44. Cryptographic system according to claim 22, further comprising a trusted authority device for issuing data allowing identification of a station of the cryptographic system; and at least one identification device included in a station of the cryptographic system and equipped with storage means for said identification allowing data; at least one verification device included in another station of the cryptographic system and adapted to cooperate with said identification device;

said trusted authority device being equipped with said trapdoor generator and further comprising means for selecting an identification data string I uniquely representative of an identity of an applicant for said identification device;

means for selecting a function f that assigns to any of said unique strings I a respective unique pair of integers (x,y) satisfying the conditions $0 \leq x < m$ and $0 \leq y < m$, whereby said integers (x,y) are representative of a point $P(x,y) = f(I)$ of an elliptic curve;

an elliptic-curve computation means for performing on said point P(x,y) an elliptic-curve computation $$Q(s,t) = d \cdot P(x,y)$$

for computing a point Q(s,t) of said elliptic curve whose coordinates are a pair of integers (s,t) representative of an encrypted string corresponding to said identification data string I; and transfer means for transferring at least said identification data string I, modulus m, public multiplier e, pair of integers (x,y) and pair of integers (s,t) to said storage means of said identification device for storage therein.

45. Cryptographic system according to claim 44, wherein said function f is provided as a setting in all stations of the cryptographic system.

46. Cryptographic system according to claim 45, wherein
said identification device comprises
means for computing integer a according to equation $$a = [(y^2/x) - x^2] \pmod{m}$$

in case the value j=4 has been selected and according to equation a=0 in case the value j=3 has been selected for said integer j at the trapdoor generator, in which latter case the means for computing integer a actually can be dispensed with;

means for selecting a random integer r satisfying the condition $0 \leq r \leq 1$ wherein l is an integer provided as a setting in the identification device and satisfying the condition l<m;

an elliptic-curve computation means for performing, on said point P(u,v) of said elliptic curve whose coordinates are said pair of integers (u,v), an elliptic-curve computation $$U(u_x, u_y) = r \cdot P(x,y)$$

for computing a point $U(u_x, u_y)$ of said elliptic curve whose coordinates are a pair of integers $(u_x, u_y)$;

an elliptic-curve computation means for performing, on said point $U(u_x, u_y)$ of said elliptic curve whose coordinates are said pair of integers $(u_x, u_y)$, an elliptic-curve computation $$V(v_x, v_y) = e \cdot U(u_x, u_y)$$

for computing a point $V(v_x, v_y)$ of said elliptic curve whose coordinates are a pair of integers $(v_x, v_y)$;

transmission means for transmitting said identification data string I and pair of integers $(v_x, v_y)$ for reception thereof at said other station including said verification device;

receiver means for receiving an integer k as a challenge from said other station including said verification device;

an elliptic-curve computation means for performing, on said point Q(s,t) of said elliptic curve whose coordinates are said pair of integers (s,t), an elliptic-curve computation $$W(w_x, w_y) = U(u_x, u_y) + k \cdot Q(s,t)$$

for computing a point $W(w_x, w_y)$ of said elliptic curve whose coordinates are a pair of integers $(w_x, w_y)$;

transmission means for transmitting said pair of integers $(w_x, w_y)$ for reception thereof at said other station including said verification device; and said verification device comprises
means for computing from said identification data string I according to said function f said pair of integers (x,y) representative of a point P(x,y)=f(I) of said elliptic curve;

means for selecting a random integer k satisfying the condition $0 \leq k \leq (e-1)$;

transmission means for transmitting said random integer k for reception thereof at said station including said identification device as a challenge;

receiver means for receiving said pair of integers $(w_x, w_y)$ as a response to said challenge from said station including said identification device;

an elliptic-curve computation means for performing, on said point $W(w_x, w_y)$ of said elliptic curve whose coordinates are said pair of integers $(w_x, w_y)$, an elliptic-curve computation $$T1(t1_x, t1_y) = e \cdot W(w_x, w_y)$$

for computing a point $T1(t1_x, t1_y)$ of said elliptic curve whose coordinates are a pair of integers $(t1_x, t1_y)$;

an elliptic-curve computation means for performing, on said point $W(w_x, w_y)$ of said elliptic curve whose coordinates are said pair of integers $(w_x, w_y)$, an elliptic-curve computation $$T2(t2_x, t2_y) = V(v_x, v_y) + k \cdot P(x,y)$$

for computing a point $T2(t2_x, t2_y)$ of said elliptic curve whose coordinates are a pair of integers $(t2_x, t2_y)$; and means for comparing said pairs of integers $(t1_x, t1_y)$ and $(t2_x, t2_y)$ with each other so as to determine whether both test conditions $t1_x = t2_x$ and $t1_y = t2_y$ are satisfied by said pairs of integers $(t1_x, t1_y)$ and $(t2_x, t2_y)$;

whereby the verification device is capable of determining whether an identification device is genuine.

47. Cryptographic system according to claim 46, wherein said means for selecting a random integer k and said transmission means for transmitting said random integer k as a challenge are constructed for recurrent operation a plurality of times in the course of an identification session.

48. Cryptographic system according to claim 44, wherein said data transferred by said transfer means also comprise said function f.

49. Cryptographic system according to claim 48, wherein
said trusted authority device further comprises transfer means for transferring said function f to a corresponding storage means provided in said verification device for locally storing said function f in said verification device;

said identification device comprises
means for computing integer a according to equation $$a = [(y^2/x) - x^2] \pmod{m}$$

in case the value j=4 has been selected and according to equation a=0 in case the value j=3 has been selected for said integer j at the trapdoor generator, in which latter case the means for computing integer a actually can be dispensed with;

means for selecting a random integer r satisfying the condition $0 \leq r \leq m$;

an elliptic-curve computation means for performing, on said point P(u,v) of said elliptic curve whose coordinates are said pair of integers (u,v), an elliptic-curve computation $$U(u_x,u_y) = r \cdot P(x,y)$$

for computing a point $U(u_x,u_y)$ of said elliptic curve whose coordinates are a pair of integers $(u_x,u_y)$;

an elliptic-curve computation means for performing, on said point $U(u_x,u_y)$ of said elliptic curve whose coordinates are said pair of integers $(u_x,u_y)$, an elliptic-curve computation $$V(v_x,v_y) = e \cdot U(u_x,u_y)$$

for computing a point $V(v_x,v_y)$ of said elliptic curve whose coordinates are a pair of integers $(v_x,v_y)$;

transmission means for transmitting said identification data string I and pair of integers $(v_x,v_y)$ for reception thereof at said other station including said verification device;

receiver means for receiving an integer k as a challenge from said other station including said verification device;

an elliptic-curve computation means for performing, on said point Q(s,t) of said elliptic curve whose coordinates are said pair of integers (s,t), an elliptic-curve computation $$W(w_x,w_y) = U(u_x,u_y) + k \cdot Q(s,t)$$

for computing a point $W(w_x,w_y)$ of said elliptic curve whose coordinates are a pair of integers $(w_x,w_y)$;

transmission means for transmitting said pair of integers $(w_x,w_y)$ for reception thereof at said other station including said verification device; and said verification device comprises input means for being inputted at least said function f from said trusted authority device by said transfer means thereof;

storage means for at least said transferred function f;

means for computing from said identification data string I according to said function f said pair of integers (x,y) representative of a point P(x,y)=f(I) of said elliptic curve;

means for selecting a random integer k satisfying the condition $0 \leq k \leq (e-1)$;

transmission means for transmitting said random integer k for reception thereof at said station including said identification device as a challenge;

receiver means for receiving said pair of integers $(w_x,w_y)$ as a response to said challenge from said station including said identification device;

an elliptic-curve computation means for performing, on said point $W(w_x,w_y)$ of said elliptic curve whose coordinates are said pair of integers $(w_x,w_y)$, an elliptic-curve computation $$T1(t1_x,t1_y) = e \cdot W(w_x,w_y)$$

for computing a point $T1(t1_x,t1_y)$ of said elliptic curve whose coordinates are a pair of integers $(t1_x,t1_y)$;

an elliptic-curve computation means for performing, on said point $W(w_x,w_y)$ of said elliptic curve whose coordinates are said pair of integers $(w_x,w_y)$, an elliptic-curve computation $$T2(t2_x,t2_y) = V(v_x,v_y) + k \cdot P(x,y)$$

for computing a point $T2(t2_x,t2_y)$ of said elliptic curve whose coordinates are a pair of integers $(t2_x,t2_y)$; and means for comparing said pairs of integers $(t1_x,t1_y)$ and $(t2_x,t2_y)$ with each other so as to determine whether both test conditions $t1_x=t2_x$ and $t1_y=t2_y$ are satisfied by said pairs of integers $(t1_x,t1_y)$ and $(t2_x,t2_y)$;

whereby the verification device is capable of determining whether an identification device is genuine.

50. Cryptographic system according to claim 49, wherein said means for selecting a random integer k and said transmission means for transmitting said random integer k as a challenge are constructed for recurrent operation a plurality of times in the course of an identification session.

51. Cryptographic system according to claim 48, wherein said trusted authority device further comprises transfer means for transferring said function f to a public directory which can be interrogated by any station for locally storing said function f in said station;

said identification device comprises means for computing integer a according to equation $$a \equiv [(y^2/x) - x^2] \pmod{m}$$

in case the value j=4 has been selected and according to equation a=0 in case the value j=3 has been selected for said integer j at the trapdoor generator, in which latter case the means for computing integer a actually can be dispensed with;

means for selecting a random integer r satisfying the condition $0 \leq r \leq m$;

an elliptic-curve computation means for performing, on said point P(u,v) of said elliptic curve whose coordinates are said pair of integers (u,v), an elliptic-curve computation $$U(u_x,u_y) = r \cdot P(x,y)$$

for computing a point $U(u_x,u_y)$ of said elliptic curve whose coordinates are a pair of integers $(u_x,u_y)$;

an elliptic-curve computation means for performing, on said point $U(u_x,u_y)$ of said elliptic curve whose coordinates are said pair of integers $(u_x,u_y)$, an elliptic-curve computation $$V(v_x,v_y) = e \cdot U(u_x,u_y)$$

for computing a point $V(v_x,v_y)$ of said elliptic curve whose coordinates are a pair of integers $(v_x,v_y)$;

transmission means for transmitting said identification data string I and pair of integers $(v_x,v_y)$ for reception thereof at said other station including said verification device;

receiver means for receiving an integer k as a challenge from said other station including said verification device;

an elliptic-curve computation means for performing, on said point Q(s,t) of said elliptic curve whose coordinates are said pair of integers (s,t), an elliptic-curve computation $$W(w_x,w_y) = U(u_x,u_y) + k \cdot Q(s,t)$$

for computing a point $W(w_x,w_y)$ of said elliptic curve whose coordinates are a pair of integers $(w_x,w_y)$;

transmission means for transmitting said pair of integers $(w_x,w_y)$ for reception thereof at said other station including said verification device; and said verification device comprises means for interrogating a public directory for being transferred therefrom at least said function f;

storage means for at least said transferred function f;

means for computing from said identification data string I according to said function f said pair of integers (x,y) representative of a point $P(x,y)=f(I)$ of said elliptic curve;

means for selecting a random integer k satisfying the condition $0 \leq k \leq (e-1)$;

transmission means for transmitting said random integer k for reception thereof at said station including said identification device as a challenge;

receiver means for receiving said pair of integers $(w_x,w_y)$ as a response to said challenge from said station including said identification device;

an elliptic-curve computation means for performing, on said point $W(w_x,w_y)$ of said elliptic curve whose coordinates are said pair of integers $(w_x,w_y)$, an elliptic-curve computation $$T1(t1_x,t1_y) = e \cdot W(w_x,w_y)$$

for computing a point $T1(t1_x,t1_y)$ of said elliptic curve whose coordinates are a pair of integers $(t1_x,t1_y)$;

an elliptic-curve computation means for performing, on said point $W(w_x,w_y)$ of said elliptic curve whose coordinates are said pair of integers $(w_x,w_y)$, an elliptic-curve computation $$T2(t2_x,t2_y) = V(v_x,v_y) + k \cdot P(x,y)$$

for computing a point $T2(t2_x,t2_y)$ of said elliptic curve whose coordinates are a pair of integers $(t2_x,t2_y)$; and means for comparing said pairs of integers $(t1_x,t1_y)$ and $(t2_x,t2_y)$ with each other so as to determine whether both test conditions $t1_x=t2_x$ and $t1_y=t2_y$ are satisfied by said pairs of integers $(t1_x,t1_y)$ and $(t2_x,t2_y)$;

whereby the verification device is capable of determining whether an identification device is genuine.

52. Cryptographic system according to claim 51, wherein said means for selecting a random integer k and said transmission means for transmitting said random integer k as a challenge are constructed for recurrent operation a plurality of times in the course of an identification session.

53. Cryptographic system according to claim 22, wherein said corresponding storage means is a public directory which can be interrogated by any station of the cryptographic system for locally storing therein said data transferred from said trapdoor generator by said transfer means.

54. Cryptographic system according to claim 22, wherein said corresponding storage means is included in a station of the cryptographic system for locally storing therein said data transferred from said trapdoor generator by said transfer means.

* * * * *